(12) United States Patent
Sugimoto

(10) Patent No.: US 7,747,157 B2
(45) Date of Patent: Jun. 29, 2010

(54) TARGET-IMAGE POSITION DETECTING APPARATUS, METHOD AND PROGRAM FOR CONTROLLING SAID APPARATUS

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 654 days.

(21) Appl. No.: 11/520,832

(22) Filed: Sep. 14, 2006

(65) Prior Publication Data

US 2007/0065134 A1 Mar. 22, 2007

(30) Foreign Application Priority Data

Sep. 16, 2005 (JP) ............................... 2005-269387

(51) Int. Cl.
G03B 3/00 (2006.01)
G03B 7/08 (2006.01)

(52) U.S. Cl. ..................... 396/123; 396/122; 396/165; 396/233; 396/332; 348/262

(58) Field of Classification Search ................... 396/14, 396/165, 122–123, 233, 332; 348/262
See application file for complete search history.

(56) References Cited

U.S. PATENT DOCUMENTS

| | | | | |
|---|---|---|---|---|
| 7,362,368 | B2* | 4/2008 | Steinberg et al. | 348/349 |
| 7,403,641 | B2* | 7/2008 | Nakamoto et al. | 382/118 |
| 2005/0058339 | A1* | 3/2005 | Kato et al. | 382/159 |
| 2005/0100195 | A1* | 5/2005 | Li | 382/118 |
| 2005/0105778 | A1* | 5/2005 | Sung et al. | 382/115 |
| 2005/0238217 | A1* | 10/2005 | Enomoto et al. | 382/128 |
| 2005/0265581 | A1* | 12/2005 | Porter et al. | 382/103 |
| 2006/0008145 | A1* | 1/2006 | Kaku | 382/173 |
| 2006/0044422 | A1* | 3/2006 | Miyazaki | 348/234 |

FOREIGN PATENT DOCUMENTS

| | | | |
|---|---|---|---|
| JP | 11-15979 A | | 1/1999 |
| JP | 2002-232783 A | | 8/2002 |
| JP | 2003-216935 A | | 7/2003 |
| JP | 2004-193962 A | | 7/2004 |
| JP | 2004193962 A | * | 7/2004 |
| JP | 2007-74394 | | 3/2007 |

* cited by examiner

Primary Examiner—Clayton E. LaBalle
Assistant Examiner—Dennis Hancock
(74) Attorney, Agent, or Firm—Birch, Stewart, Kolasch, & Birch, LLP.

(57) ABSTRACT

A face-image area is decided with comparatively good accuracy. An (N−1)th frame of a subject image α1 and an Nth frame of a subject image α2 are obtained by sensing the image of a subject successively. Face-image detection processing is applied to the frames of the subject images α1 and α2 to detect face-image areas C1, C2 and C3. The face-image area C2 is construed to be linked to the face-image area C1, which is the corresponding face-image area. Since a face-image area that corresponds to the face-image area C3 does not exist, the face-image area C3 is construed as not being linked. The linked face-image area C2 in the Nth frame of the subject image α2 is decided upon as a face-image area. Thus, face areas can be decided with comparatively good accuracy.

8 Claims, 39 Drawing Sheets

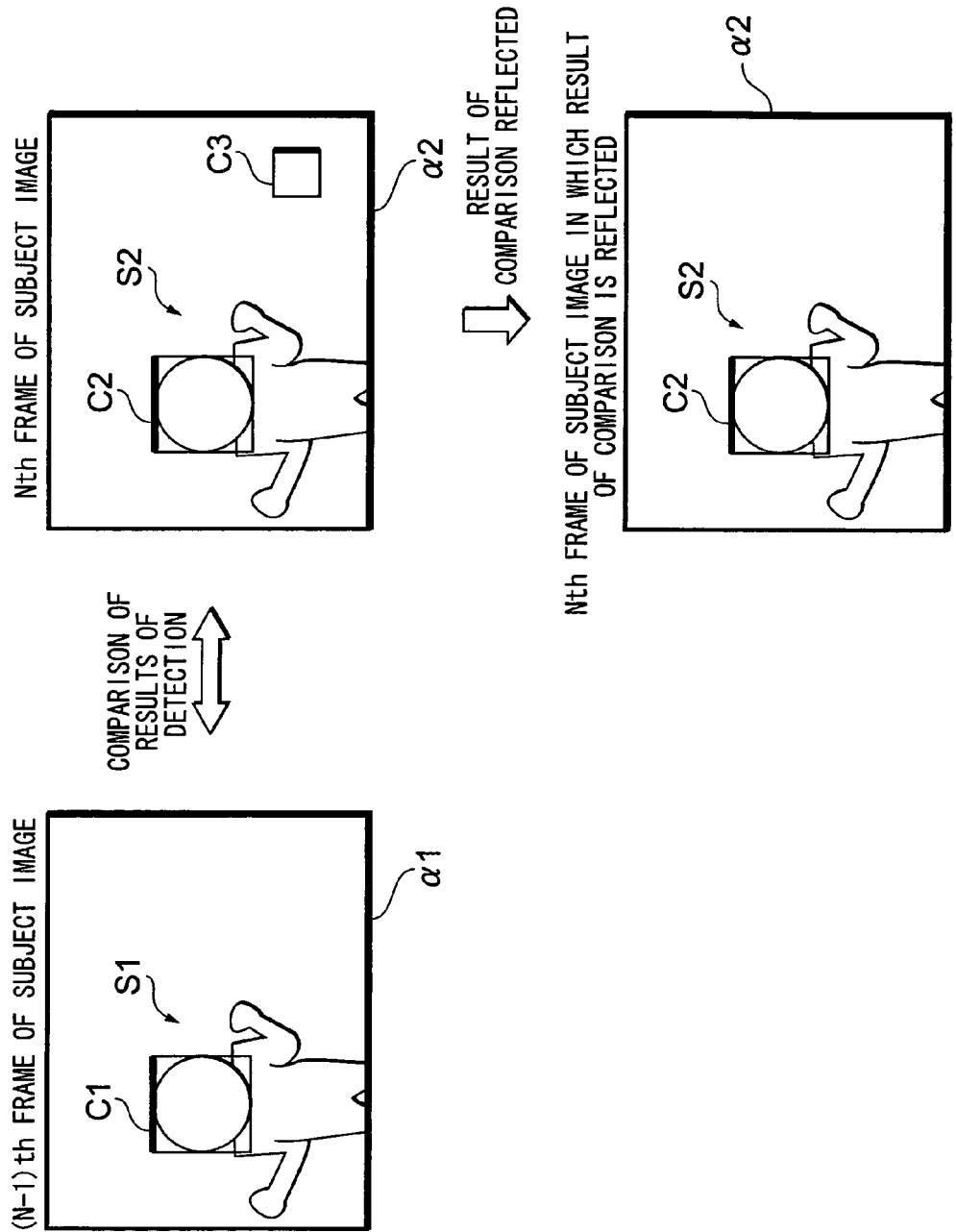

Fig. 3

RESULT OF FACE DETECTION IN (N-1)th FRAME OF SUBJECT IMAGE

| NUMBER | 1 | | | | |
|---|---|---|---|---|---|
| FACE NO. | POSITION | SIZE | IN-PLANE ANGLE OF ROTATION | OUT-OF-PLANE ANGLE OF ROTATION | SCORE |
| 1 | x1, y1 | SI1 | IN1 | OUT1 | SC1 |
| | | | | | |

Fig. 4

RESULT OF FACE DETECTION IN Nth FRAME OF SUBJECT IMAGE

| NUMBER | 2 | | | | |
|---|---|---|---|---|---|
| FACE NO. | POSITION | SIZE | IN-PLANE ANGLE OF ROTATION | OUT-OF-PLANE ANGLE OF ROTATION | SCORE |
| 1 | x1, y1 | SI1 | IN1 | OUT1 | SC1 |
| 2 | x2, y2 | SI2 | IN2 | OUT2 | SC2 |

Fig. 5

RESULT OF COMPARISON

| Nth FRAME | FACE NO. | POSITION | SIZE |
|---|---|---|---|
| | 1 | x1, y1 | SI1 |

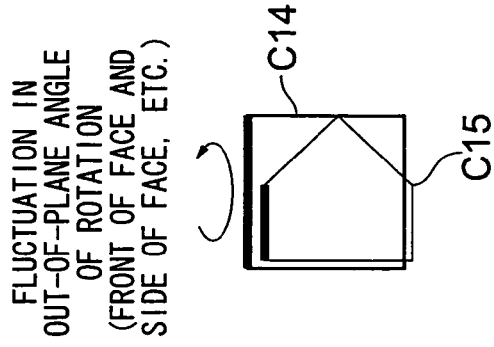
Fig. 10D  FLUCTUATION IN OUT-OF-PLANE ANGLE OF ROTATION (FRONT OF FACE AND SIDE OF FACE, ETC.)
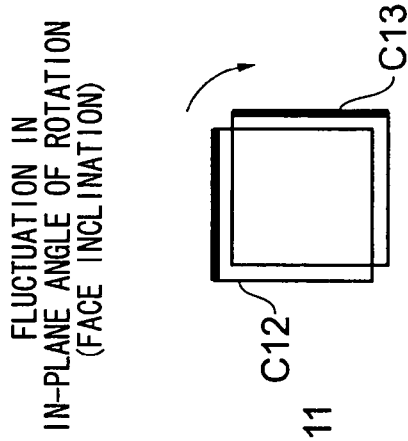
Fig. 10C  FLUCTUATION IN IN-PLANE ANGLE OF ROTATION (FACE INCLINATION)
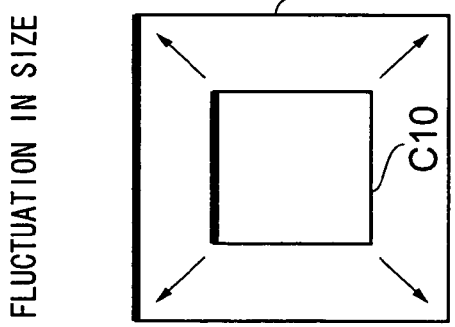
Fig. 10B  FLUCTUATION IN SIZE
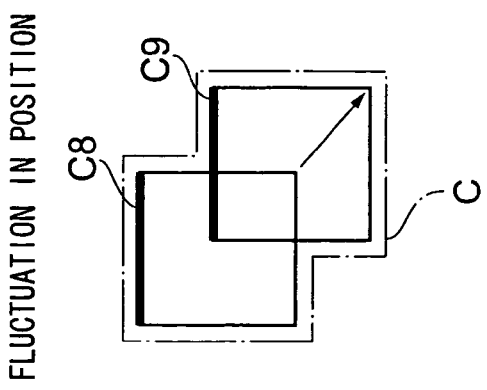
Fig. 10A  FLUCTUATION IN POSITION

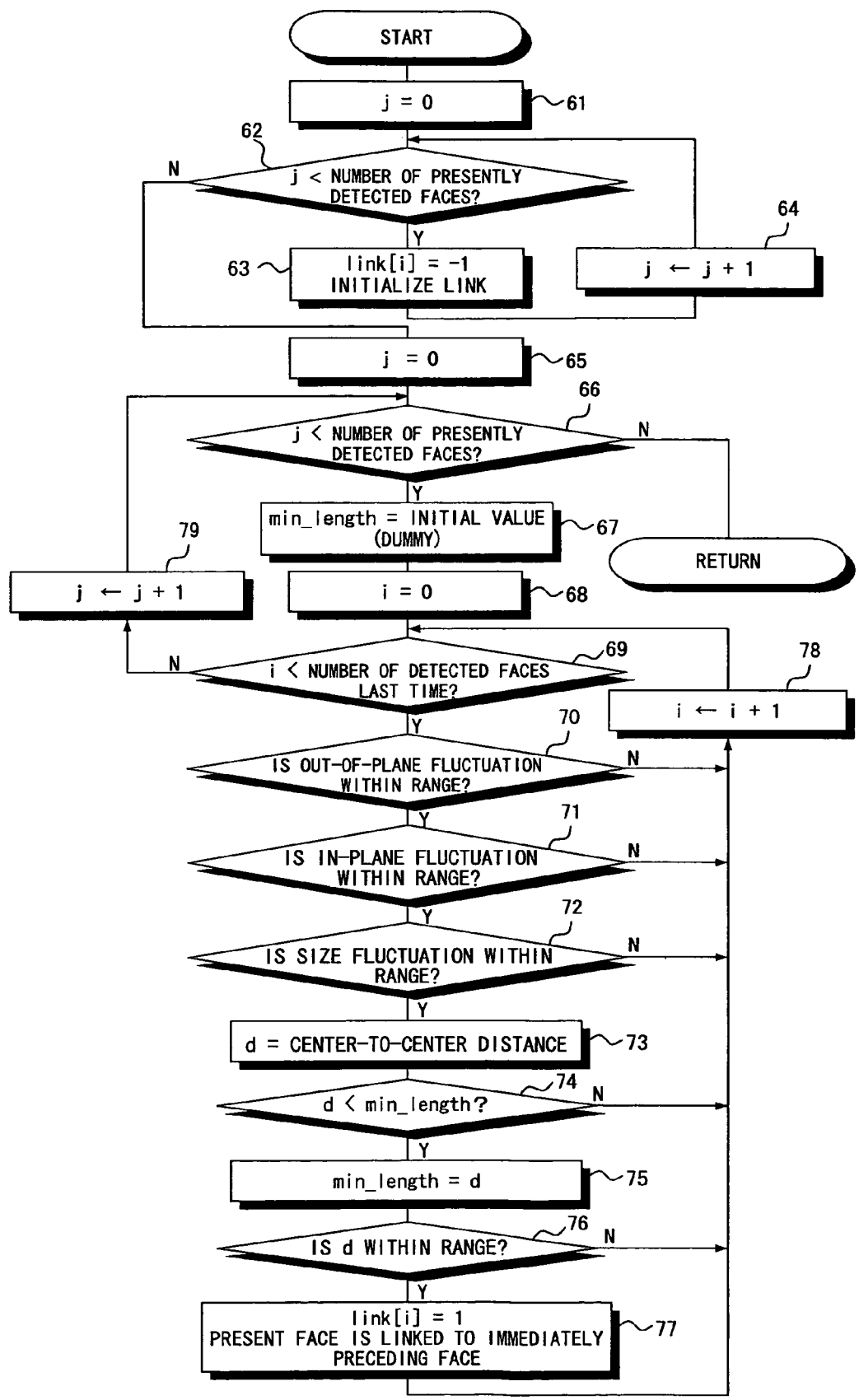

*Fig. 19A* *Fig. 19B*
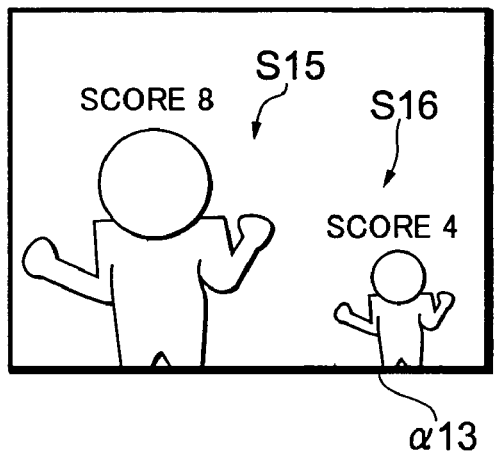
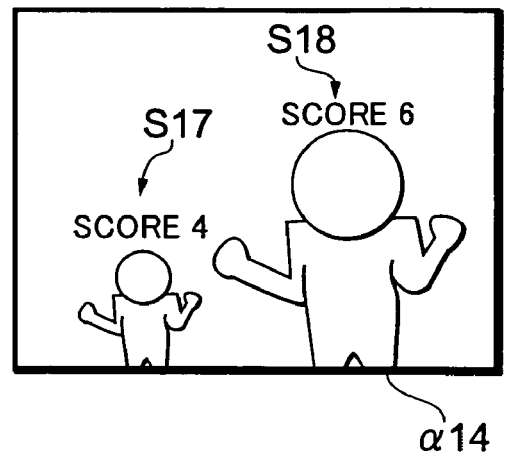

*Fig. 20A*  *Fig. 20B*
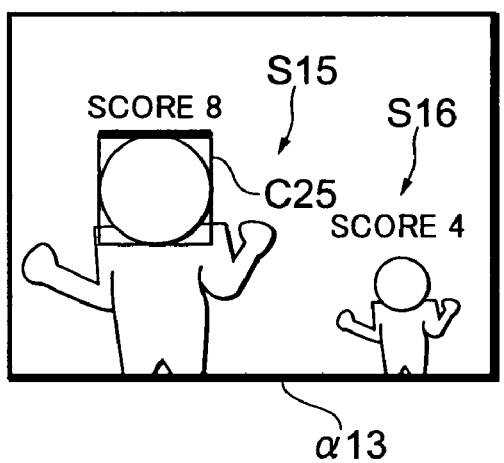
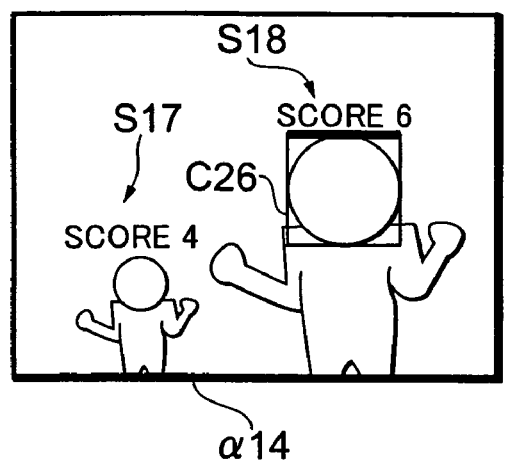
*Fig. 20C*
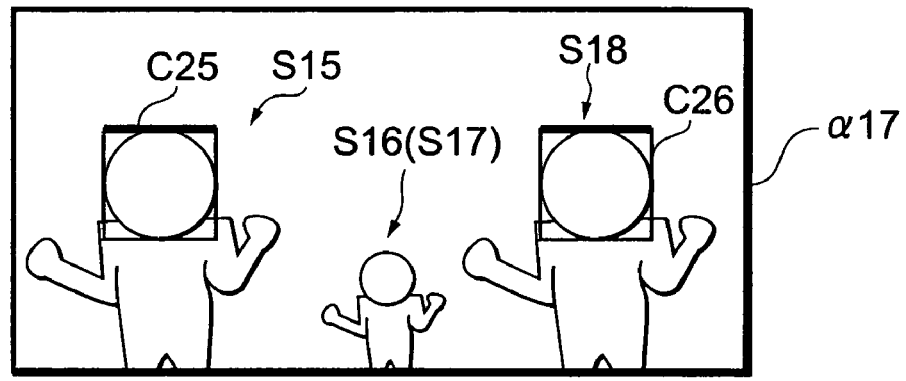

*Fig. 23*

| R | G | R | G |
|---|---|---|---|
| G | B | G | B |
| R | G | R | G |
| G | B | G | B |

| R | R |
|---|---|
| R | R |

| G | G |
|---|---|
| G | G |

| B | B |
|---|---|
| B | B |

VISIBLE-LIGHT SENSOR

| R | G | R | G |
|---|---|---|---|
| G | B | G | B |
| R | G | R | G |
| G | B | G | B |

Fig. 27B

INFRARED SENSOR

| IR | IR | IR | IR |
|----|----|----|----|
| IR | IR | IR | IR |
| IR | IR | IR | IR |
| IR | IR | IR | IR |

Fig. 28

VISIBLE-LIGHT / INFRARED SENSOR

| R  | G | R  | G |
|----|---|----|---|
| IR | B | IR | B |
| R  | G | R  | G |
| IR | B | IR | B |

TARGET-IMAGE POSITION DETECTING APPARATUS, METHOD AND PROGRAM FOR CONTROLLING SAID APPARATUS

BACKGROUND OF THE INVENTION

1. Field of the Invention

This invention relates to an apparatus and method for detecting the position of a target image, and to a program for controlling this apparatus.

2. Description of the Related Art

When the subject of photography is a person, often it is desired that the portion of the subject image that is the face be imaged attractively. In order to accomplish this, there are instances where the face-image portion is detected from within the image of the subject. There are cases where a plurality of face detections are performed with regard to the same image in order to raise the accuracy of face detection (see the specification of Japanese Patent Application Laid-Open No. 2003-216935).

Further, in a situation in which images of a subject are applied one after another, there are instances where an area in the vicinity of a face image detected in the immediately preceding frame of the subject image is stipulated as an area for detecting the face image portion in the present frame of the subject image (see the specification of Japanese Patent Application Laid-Open No. 11-15979).

However, if erroneous detection is performed in the preceding frame of the image of the subject, this may have an effect upon detection in subsequent frames of subject images. The detection accuracy may become low.

SUMMARY OF THE INVENTION

Accordingly, an object of the present invention is to raise the accuracy with which a target such as a face is detected.

According to the present invention, the foregoing object is attained by providing an apparatus for detecting the position of a target image, comprising: a first detecting device (means) for detecting a first position at which a target image is present from a first subject image among a plurality of frames of subject images obtained by sensing, simultaneously or successively, the images of subjects regarded as being substantially identical; a second detecting device (means) for detecting a second position at which the target image is present from a second subject image among the plurality of frames of subject images; and a deciding device (means) for deciding a position at which the target image is present in at least one of the first and second subject images based upon the first position detected by the first position detecting device and the second position detected by the second position detecting device.

The present invention also provides a method suited to the target-image position detecting apparatus described above. More specifically, the present invention provides a method of detecting the position of a target image, comprising the steps of: detecting a first position at which a target image is present from a first subject image among a plurality of frames of subject images obtained by sensing, simultaneously or successively, the images of subjects regarded as being substantially identical; detecting a second position at which the target image is present from a second subject image among the plurality of frames of subject images; and deciding a position at which the target image is present in at least one of the first and second subject images based upon the first and second positions detected.

The present invention also provides a program for implementing the subject-image position detection method described above.

In accordance with the present invention, a first position at which a target image is present is detected from a first subject image among a plurality of frames of subject images obtained by sensing, simultaneously or successively, the images of subjects regarded as being substantially identical. (Subject images obtained successively refer to subject images obtained through a single image-sensing sequence such as preliminary image sensing, image sensing of a moving image, continuous shooting or blanket image sensing.) A second position at which the target image is present also is detected from a second subject image among the plurality of frames of subject images.

The position at which the target image is present is decided in at least one of the first and second subject images based upon the first and second positions detected. The position at which the target image is present is decided by comparing the first and second positions. This means that detection accuracy is improved in comparison with a case where the position of the target image is detected based solely upon the first position detected in the first subject image or the second position detected in the second subject image. Detection processing of a comparatively high accuracy can be realized.

The apparatus may further comprise an image sensing device for sensing, simultaneously or successively, the images of subjects regarded as being substantially identical and outputting image data representing a plurality of frames of subject images. In this case, the first detecting device would detect the position at which the target image is present from the first subject image among the plurality of subject images represented by the image data that has been output from the image sensing device, and the second detecting device would detect the position at which the target image is present from the second subject image among the plurality of subject images represented by the image data that has been output from the image sensing device.

The first detecting device and the second detecting device may be a common detecting device.

The apparatus may further comprise a position converting device (means). If the sizes of the first and second subject images are different, the position converting device converts at lease one position of the first position that has been detected by the first detecting device and second position that has been detected by the second detecting device in such a manner that the position becomes a position that prevails in a case where the size of the first subject image and the size of the second subject image are identical. In this case the deciding device would decide the position at which the target image is present based upon the first and second positions obtained by the conversion performed by the position converting device.

Even if the sizes of the first and second subject images are different, the position at which the target image is present can be decided based upon the first and second positions.

The apparatus may further comprise an image sensing device for sensing the image of a subject and outputting image data representing the image of the subject; a first image-sensing control device (means) for controlling the image sensing device in accordance with a preliminary image-sensing command so as to sense the image of the subject and output first image data representing the first subject image; and a second image-sensing control device (means) for controlling the image sensing device in accordance with a regular image-sensing command so as to sense the image of the subject and output second image data representing the second subject image. In this case the first detecting device would detect the position at which the target image is present from within the first subject image represented by the first image data that has been output from the (first) image sensing device under the control of the first image-sensing control device, and the second detecting device would detect the position at which the target image is present from within the second subject image represented by the second image data that has been output from the (second) image sensing device under the control of the second image-sensing control device.

In a case where the apparatus is a digital camera in which regular image sensing is performed in response to the depression of a shutter-release button and image data obtained by this regular image sensing is recorded on a recording medium such as a memory card, the position at which the target image is present can be detected from the first position obtained from the first subject image, which has been obtained by image sensing (preliminary image sensing) that precedes regular image sensing, and the second position obtained from the second subject image, which has been obtained by regular image sensing.

The apparatus may further comprise: a determination device (means) for determining whether image sensing conforming to the regular image-sensing command is to be performed in sync with a flash light-emission; and a decision control device (means), which is responsive to a determination by the determination device that image sensing is to be performed in sync with a flash light-emission, for controlling the deciding device so as to halt decision processing in the deciding device and decide upon the second position, which has been detected by the second detecting device, as the position at which the target image is present.

If regular image sensing is performed in sync with the firing of a flash, there are instances where the first subject image obtained by preliminary image sensing is dark. On the other hand, since the second subject image obtained by performing image sensing in sync with a flash light-emission is one having comparatively appropriate brightness, often the target image is detected with comparatively good accuracy. Since the first subject image is dark, however, the target image may not be detected. Even though the first position obtained from the first subject image and the second position obtained from the second subject image are compared, there are instance where the position at which the target image is present cannot be decided. Decision processing, therefore, is halted. The second position obtained from the second subject image, which is obtained in sync with firing of the flash, is decided upon as the position at which the target image is present. Erroneous detection can be prevented before it occurs.

The apparatus may further comprise an exposure adjusting device (means) for adjusting amount of exposure of the image sensing device based upon the first image data that is output from the image sensing device based upon control in the first image-sensing control device. In this case, control in the second image-sensing control device would cause the image sensing device to output the second image data in response to the regular image-sensing command based upon the amount of exposure obtained by adjustment performed by the exposure adjusting device. The apparatus may further comprise a determination device for determining whether the amount of exposure in the image sensing device controlled by the first image-sensing control device is less than a threshold value; and a decision control device (means), responsive to a determination by the determination device that the amount of exposure is less than a threshold value, for controlling the deciding device so as to halt decision processing in the deciding device and decide upon the second position, which has been detected by the second detecting device, as the position at which the target image is present.

In a case where the amount of exposure has been determined to be less than a threshold value, the first position has little reliability, in a manner similar to that of processing regarding the flash light-emission. The second position, therefore, is decided upon as the position at which the target image is present.

By way of example, if the amount of fluctuation between the first position detected by the first detecting device and the second position detected by the second detecting device is equal to or greater than a prescribed threshold value, then the deciding device decides that the target image is not present in at least one of the first and second subject images. In a case where the amount of variation is equal to or greater than the threshold value, it is considered that the target images are different or that erroneous detection has occurred and therefore a decision is rendered to the effect that a target image does not exist.

The first detecting device may detect the first position at which the target image is present from the first subject image obtained by a first image sensing operation from among a plurality of frames of subject images that have been obtained by sensing a plurality of times, successively in terms of time, the images of subjects regarded as being substantially identical. In this case the second detecting device detects the second position at which the target image is present from the second subject image obtained by a second image sensing operation from among the plurality of frames of subject images. The apparatus further comprises a third detecting device for detecting a third position at which the target image is present from a third subject image obtained by a third sensing image operation from among the plurality of frames of subject images. Furthermore, the detecting device would decide that the position at which the target image is present is in at least one subject image among the first, second and third subject images based upon the first position, second position and third position detected by the first, second and third detecting devices, respectively.

In a case where the target image could not for some reason be detected in the second subject image among the first, second and third subject images, the target image can be detected using three frames of subject images, namely the first, second and third subject images. Thus it is possible to avoid an instance where a target image is not found despite the fact that the target image exists.

The detecting device may decide that the position at which the target image is present is in the third subject image based upon (a) a third position at which, among third positions detected by the third detecting device, a target image corresponding to the second position detected by the second detecting device is not present, and (b) a first position at which, among first positions detected by the first detecting device, target images corresponding to both the second position detected by the second detecting device and the third position detected by the third detecting device are not present.

The apparatus may further comprise a first image sensing device for outputting first image data representing the first subject image by sensing the image of a subject; and a second image sensing device for outputting second image data representing the second subject image by sensing the image of the subject. In this case, the first detecting device would detect the position at which the target image is present from the first subject image represented by the first image data that has been output from the first image sensing device. Further, the second detecting device would detect the position at which the target image is present from the second subject image represented by the second image data that has been output from the second image sensing device.

The first and second image sensing devices may be built in the same case or may be built in different cases.

The first and second image sensing devices may have the same or different image-sensing ranges.

By way of example, the first detecting device detects, from the first subject image, the first position at which the target image is present based upon a value of target-image likeliness. Further, by way of example, the second detecting device also detects, from the second subject image, the second position at which the target image is present based upon a value of target-image likeliness. In this case, the deciding device would decide the position at which the target image is present based upon the value of target-image likeliness of the target image detected in the first detecting device and the value of target-image likeliness of the target image detected in the second detecting device.

The apparatus may further comprise a single-chip solid-state electronic image sensing device in which color filters of a plurality of colors are provided systematically on a photoreceptor surface, the device sensing the image of a subject to thereby output color image data of a plurality of colors representing a color image of the subject. In this case the first subject image is represented by color image data of a single color in the color image data of the plurality of colors that has been output from the single-chip solid-state electronic image sensing device, and the second subject image is represented by color image data of a color different from that of the color image data of the single color in the color image data of the plurality of colors.

The apparatus may further comprise a solid-state electronic image sensing device that includes a plurality of a plurality of solid-state electronic image sensors in which color filters of different colors are provided on a photoreceptor surface, the device sensing the image of a subject to thereby output color image data of different colors. In this case the first subject image would be represented by color image data of one type in the color image data that has been output from the solid-state electronic image sensing device, and the second subject image would be represented by color image data of a type different from that of the color image data of the one type in the color image data.

The apparatus may further comprise a visible-light sensor for sensing the image of a subject to thereby output visible-light image data that represents the first subject image as a visible-light image; and an infrared sensor for sensing the image of a subject to thereby output infrared-light image data that represents the second subject image as an infrared image. In this case the first detecting device would detect the position at which the target image is present from the first subject image represented by the visible-light image data that has been output from the visible-light sensor, and the second detecting device would detect the position at which the target image is present from the second subject image among the plurality of frames of subject images represented by the infrared image data that has been output from the infrared sensor.

The apparatus may further comprise a visible-light/infrared solid-state electronic image sensing device that includes a visible-light filter (a filter having a characteristic that transmits visible light) and an infrared filter (a filter having a characteristic that passes infrared radiation), the device sensing the image of a subject to thereby output visible-light image data that represents the first subject image as a visible-light image and output infrared image data that represents the second subject image as an infrared image. In this case the first detecting device would detect the position at which the target image is present from the first subject image represented by the visible-light image data that has been output from the visible-light/infrared solid-state electronic image sensing device, and the second detecting device would detect the position at which the target image is present from the second subject image represented by the infrared image data that has been output from the visible-light/infrared solid-state electronic image sensing device.

The apparatus may further comprise an image sensing device for sensing the image of a subject at fixed periods and alternately outputting first image data representing a first field of subject image and image data representing a second field of the subject image. In this case the first detecting device would detect the position at which the target image is present from the first field of the subject image represented by a first field of image data that has been output from the image sensing device, and the second detecting device would detect the position at which the target image is present from the second field of the subject image represented by a second field of image data that has been output from the image sensing device.

For example, the image sensing device senses, simultaneously or successively while changing image-sensing conditions, the images of subjects regarded as being substantially identical and outputs image data representing a plurality of frames of subject images.

The change in image-sensing conditions is at least one among a change in amount of exposure, f-stop value, shutter speed, amount of focus, amount of zoom, sensitivity and flash.

The apparatus may further comprise an image processing device (means) for sensing the image of a subject and applying different types of signal processing to image data representing one frame of the subject image. In this case the first detecting device may detect the position at which the target image is present from the first subject image represented by image data that has subjected to one type of signal processing among the types of signal processing executed by the signal processing device. In this case the second detecting device would detect the position at which the target image is present from the second subject image represented by image data that has been subjected to other signal processing different from the one type of signal processing among the types of signal processing executed by the signal processing device. The first and second positions can be detected from the first and second subject images obtained by execution of different types of signal processing.

The deciding device may decide that a position in the vicinity of a first position at which, among first positions detected by the first detecting device, a target image corresponding to the second position detected by the second detecting device is present, is a position at which the target image is present in the image of the subject.

The apparatus may further comprise a hardware control device (means) for exercising hardware control based upon the position, decided by the deciding device, at which the target image is present.

By way of example, hardware control is at least one among automatic exposure control, automatic focus control, flash control, power-saving control and zoom control.

The apparatus may further comprise a signal processing device (means) for executing signal processing based upon the position, decided by the deciding device, at which the target image is present. Prescribed signal processing can be applied to the target image present at the position detected.

The signal processing device executes at least one type of signal processing among gain adjustment, white balance adjustment, color correction, contour emphasis, noise reduction and tone correction.

The target image is the image of a face or eye, by way of example.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 illustrates examples of images of a subject;
FIG. 3 illustrates results of face detection in an (N−1)th subject image;
FIG. 4 illustrates results of face detection in an Nth subject image;
FIG. 5 illustrates an example of results of comparison;
FIGS. 10A to 10D are examples of fluctuation of face-image areas;
FIG. 11 is a flowchart illustrating linking processing;
FIGS. 19A and 19B illustrate examples of subject images;
FIGS. 20A to 20C illustrate examples of subject images;
FIG. 23 illustrates an example of the photoreceptor surface of a single-chip image sensor;
FIGS. 24A to 24C illustrate examples of monochromatic subject images;
FIGS. 25A to 25C illustrate examples of interpolated monochromatic subject images;
FIGS. 26A to 26C illustrate photoreceptor surfaces of a three-chip solid-state electronic image sensing element;
FIG. 27A illustrates the photoreceptor surface of a visible-light sensor and FIG. 27B the photoreceptor surface of an infrared sensor;
FIG. 28 illustrates the photoreceptor surface of a visible-light/infrared sensor.

DESCRIPTION OF THE PREFERRED EMBODIMENTS

Preferred embodiments of the present invention will now be described in detail with reference to the drawings.

Figure 1:
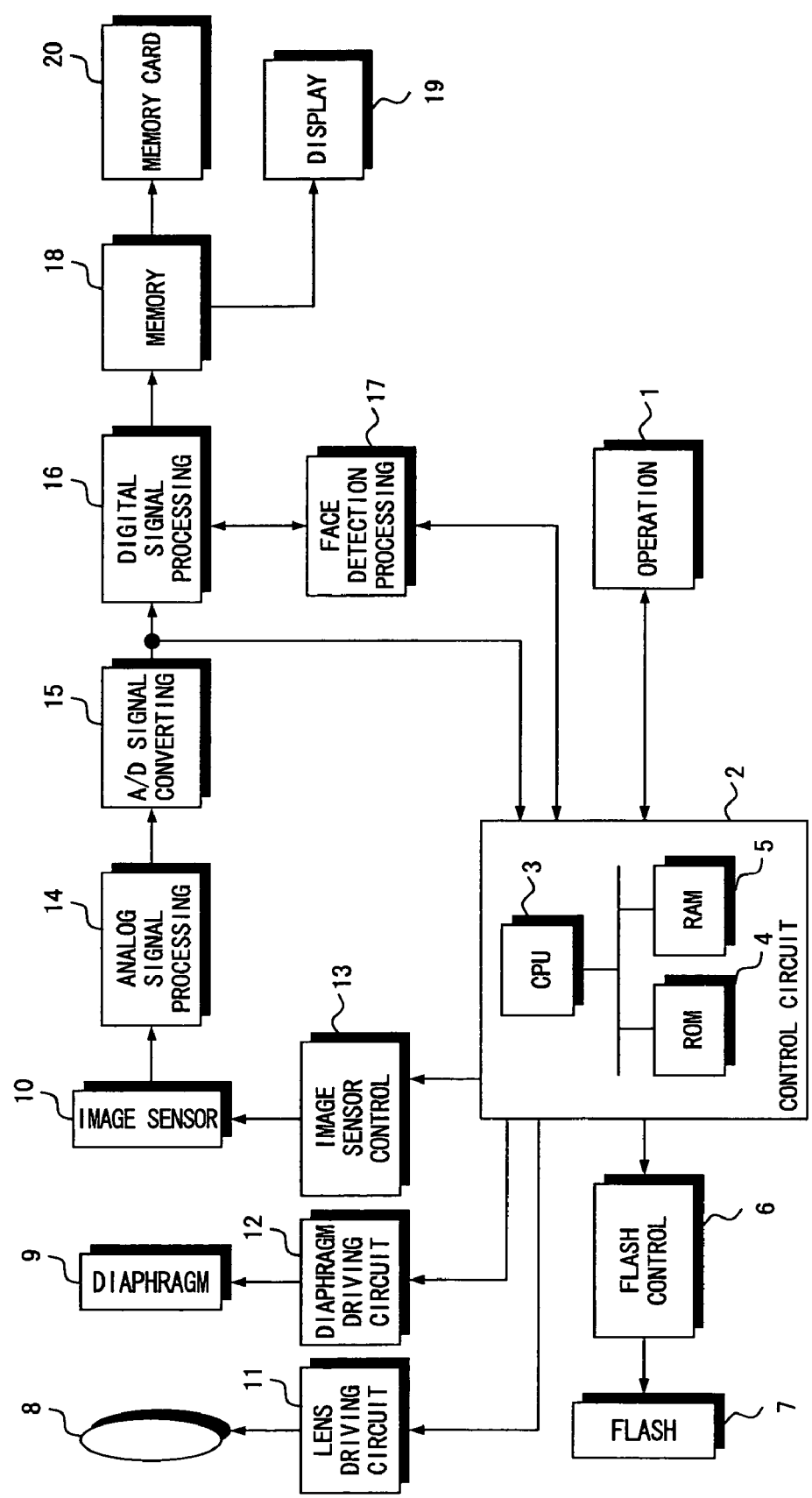
FIG. 1 is a block diagram illustrating the electrical structure of a digital still camera.

FIG. 1, which illustrates an embodiment of the invention, is a block diagram illustrating the electrical structure of a digital still camera.

The overall operation of the digital still camera is controlled by a control circuit 2. The latter includes a CPU 3, a ROM 4 in which the operating program of the digital still camera, the operation of which will be described later, has been stored, and a RAM 5 for storing data and the like temporarily. The digital still camera may be provided with a communication function and can also be made to operate as described later by receiving an operating program that has been transmitted to it. It goes without saying that if an operating program is stored on a memory card, then the operating program can also be read from the memory card and installed in the digital still camera.

The digital still camera includes operating buttons 1 such as a shutter-release button and mode setting switch. Operating signals that are output from the operating buttons 1 are input to the control circuit 2. The digital still camera is further provided with a flash unit 7 controlled by a flash control circuit 6.

If an image sensing mode is set by the mode setting switch, light flux is converged by an imaging lens 8 controlled by a lens driving circuit 11, and the converged light impinges upon the photoreceptor surface of an image sensor 10 via a diaphragm 9 controlled by a diaphragm driving circuit 12. The image of a subject is formed on the photoreceptor surface of the image sensor 10. The latter is controlled by a control circuit 13 for controlling the image sensing device so that a video signal representing the image of the subject (a so-called "thru-image signal" indicating a "thru-image") will enter an analog signal processing circuit 14 at fixed image sensing periods (this is preliminary image sensing). The analog signal processing circuit 14 executes prescribed analog signal processing such as correlated double sampling. The video signal that is output from the analog signal processing circuit 14 is converted to digital image data and input to a digital signal processing circuit 16 by an analog/digital converting circuit 15. The digital signal processing circuit 16 executes prescribed signal processing such as a gamma correction and white balance adjustment. Image data that is output from the digital signal processing circuit 16 is applied to a display unit 19 via a memory 18. The image of the subject obtained by image sensing is displayed on the display screen of the display unit 19.

If the shutter-release signal is pressed, the image data that has been output from the digital signal processing circuit 16 is applied to and stored temporarily in the memory 18 as mentioned above. The image data is output from the memory 18 and recorded on a memory card 20.

In the digital still camera according to this embodiment, the area of a face image can be detected from within the image of the subject. In order to accomplish this, the digital still camera is provided with a face detection processing circuit 17. Image data that has been output from the digital signal processing circuit 16 as described above is input to the face detection processing circuit 17 as well. As will be described later, the face detection processing circuit 17 detects an area indicative of a portion of the subject image that is a face image.

In this embodiment, at least two frames of a subject image are utilized. Processing for detecting a face-image portion is executed in each of the frames of the subject image. The area of the face-image portion is decided based upon the areas of the face-image portions detected in respective ones of the frames of the subject image.

FIG. 2 illustrates examples of images of a subject and is useful in describing processing for detecting the area of a face image according to this embodiment.

If the image sensing mode is set as mentioned above, the image of the subject is sensed repeatedly at the fixed periods and an (N−1)th frame of a subject image α1 and an Nth frame of a subject image α2 are obtained. Processing for detecting a face image is executed in the subject images α1 and α2 of these two frames. For example, the (N−1)th frame of the subject image α1 includes an image S1 of a person, and an area C1 of a face image is detected by executing face-image detection processing. The Nth frame of the subject image α2 includes an image S2 of a person, and an area C2 of a face image is detected by executing face-image detection processing. The face-image area C2 is considered to be at a position that corresponds to the face-image area C1 detected in the (N−1)th frame of the subject image α1. In this embodiment, therefore, it is stipulated that the face-image area C2 is linked to the face-image area C1. Further, a face-image area C3 also is detected by face detection processing in the Nth frame of the subject image α2. Since an area that corresponds to the face-image area C3 has not been detected in the (N−1)th frame of the subject image α1, it is stipulated that the face-image area C3 has not been linked.

In this embodiment, processing is executed to compare the result of face detection in the (N−1)th frame of the subject image α1 and the result of face detection in the Nth frame of the subject image α2. The area in which the face image is detected in the Nth frame of the subject image α2 is adopted as an area having linkage. In the Nth frame of the subject image α2, therefore, the area C3 having no linkage is not adopted as a face-image area and the linked area C2 is decided upon as the area of the face image.

Further, in this embodiment, the face-image area undergoes detection with regard to its upper and lower parts at well. In the areas C1 to C3 of the detected face images in FIG. 2, the upper part of the face-image area is illustrated as being bolder than other parts.

FIG. 3 illustrates results of face detection of the (N−1)th frame of the subject image α1, and FIG. 4 illustrates results of face detection of the Nth frame of the subject image α2.

The following items are detected in face detection processing: number of face-image areas detected; a face number indicating the number of the face-image area detected; position of the face-image area; size of the face-image area; in-plane angle of rotation of the face-image area; out-of-plane angle of rotation of the face-image area; and score. These items such as the number of face-image areas detected are stored as face detection results in correspondence with the image of the subject. The in-plane angle of rotation obtained as a result of face detection refers to the angle of inclination of the face in a case where the face is facing forward. The out-of-plane angle of rotation refers to the angle in a case where the face is facing sideways, using as a reference a case where the face is facing forward.

FIG. 5 illustrates a table of results of comparison.

As mentioned above, the result of detecting the (N−1)th frame of the subject image α1 and the result of detecting the Nth frame of the subject image α2 are compared. As a result of the comparison, the face number, position and size that correspond to the area having linkage in the manner described above are stored in the table of comparison results.

Figure 6:
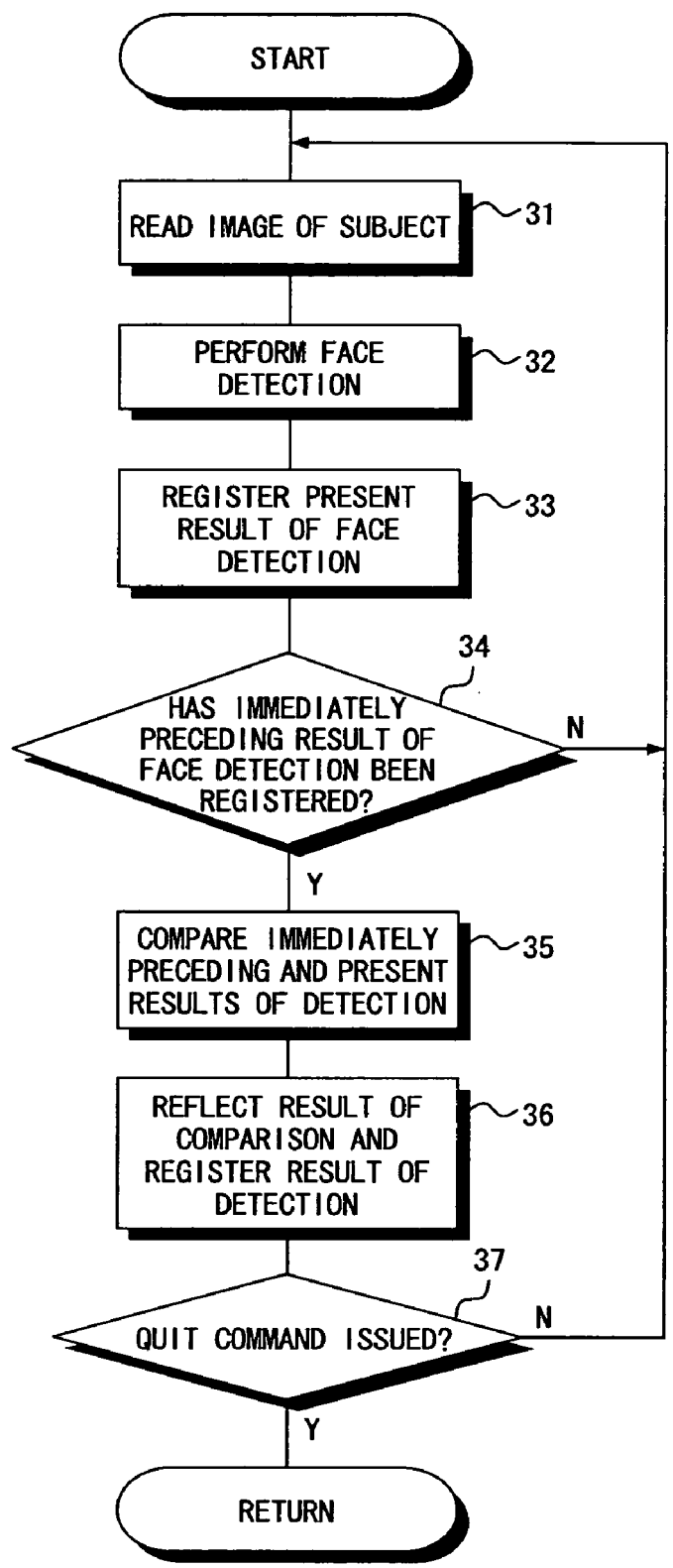
FIG. 6 is a flowchart illustrating processing for detecting a face image.

FIG. 6 is a flowchart illustrating processing for detecting a face image.

When the image sensing mode is set, as mentioned above, the image of the subject is sensed at fixed periods and a specific single frame of the image of the subject is obtained (step 31). Face detection processing is applied to the single frame of the subject image obtained (step 32) and the result of this face detection is registered (step 33).

If an immediately preceding result of face image detection (preceding frame) has not been registered ("NO" at step 34), processing from step 31 onward is repeated.

If an immediately preceding result of face image detection has been registered ("YES" at step 34), the processing is executed to compare the preceding result of face detection and the present result of face detection (step 35). The result of comparison representing a face-image detection area linked as described above is registered based upon the result of comparison processing (step 36). The face-image area specified by the information registered in the result of comparison is decided upon as the face-image area of the present subject image.

The processing from step 31 onward is repeated until a quit command is issued by the user (step 37).

In a case where a face-image area that corresponds to the face-image area detected in the present cycle of face-image detection processing was detected in the preceding cycle of face-image detection processing, the face-image area has been decided upon as the face-image area in the present subject image. Therefore, if a face-image area has been detected neither currently nor previously, it is not decided upon as the face-image area. Since an area in which a face-image area has been erroneously detected from the present subject image is excluded as a face-image area, the accuracy with which a face-image area is detected rises. It goes without saying that in a case where a face-image area corresponding to a face-image area detected in the preceding cycle of face-image detection processing is detected also in the present cycle of face-image detection processing, this face-image area may be decided upon as the face-image area in the preceding subject image.

Figure 7:
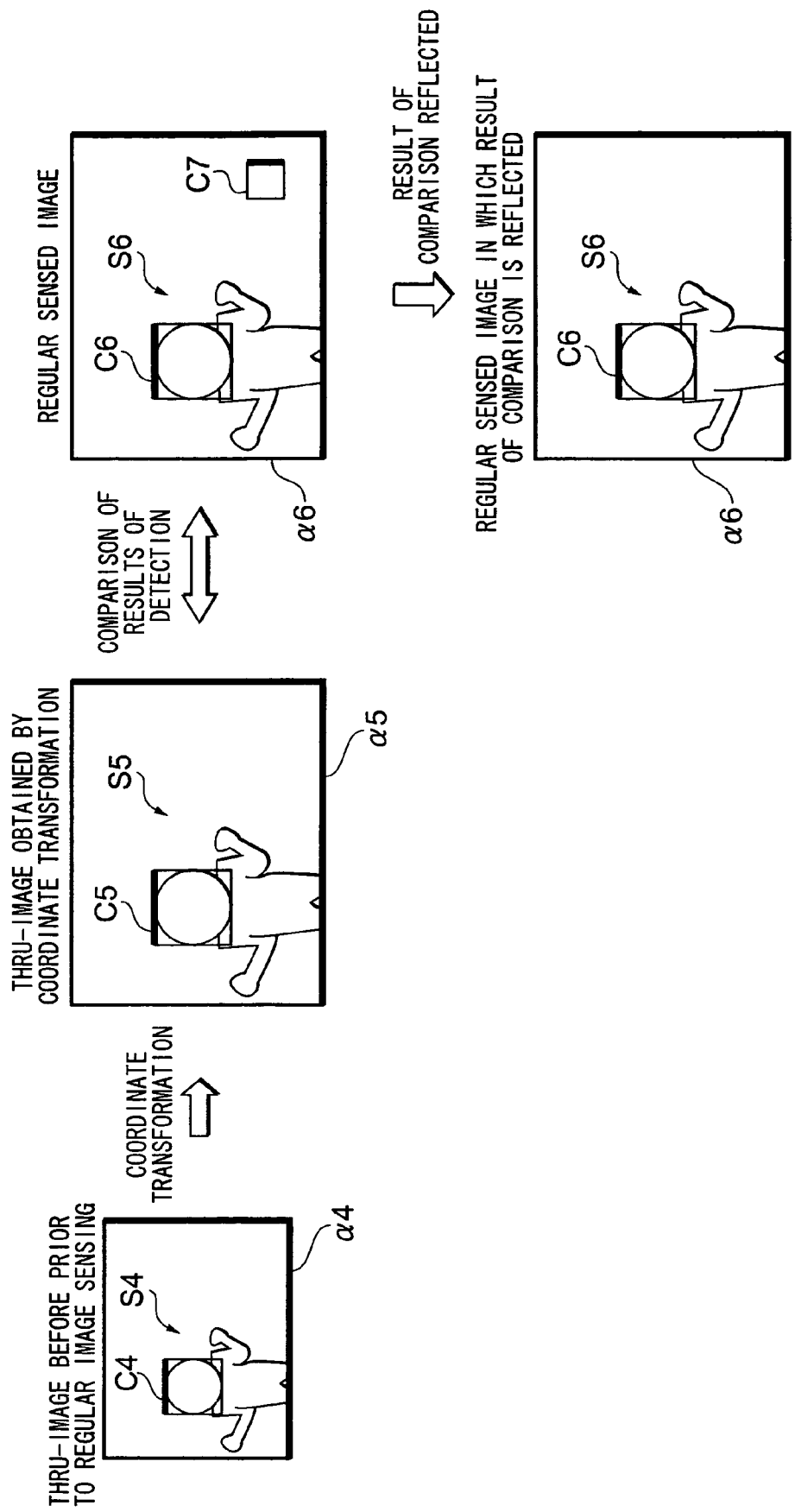
FIG. 7 illustrates examples of thru-images and images obtained by regular image sensing.
Figure 8:
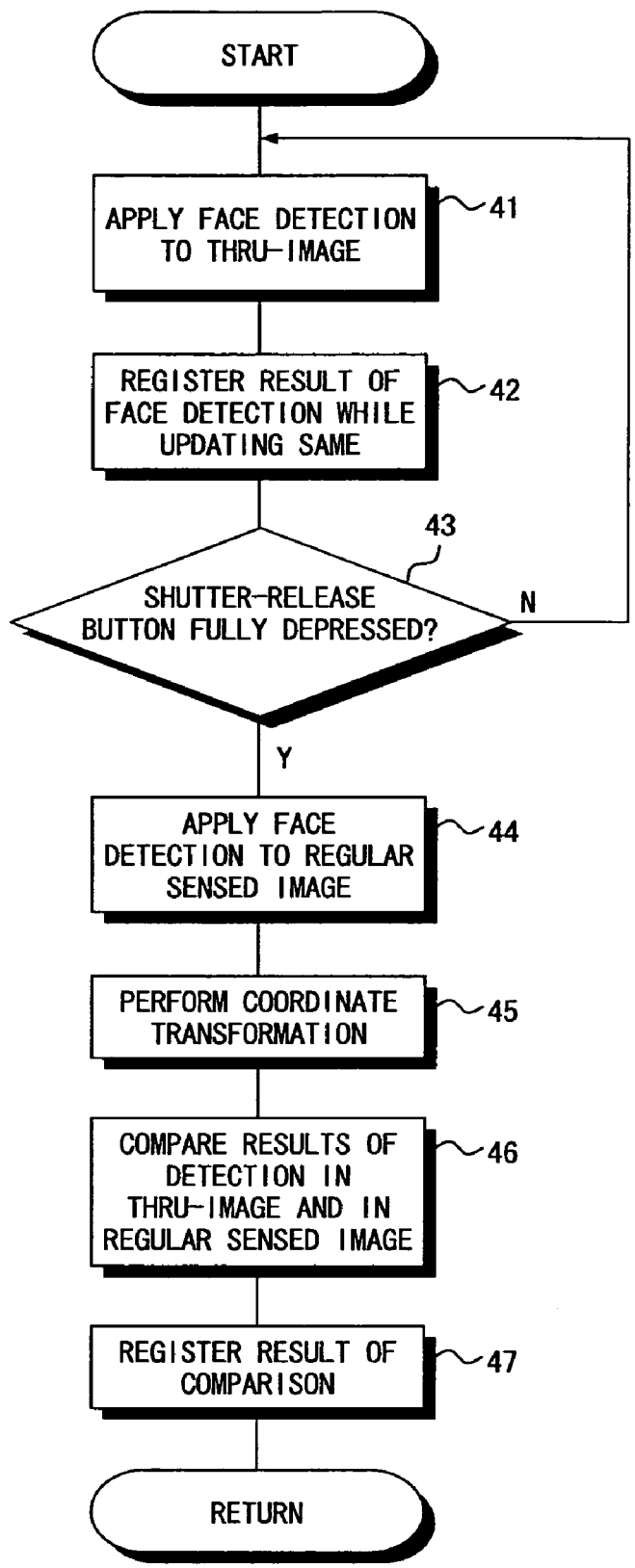
FIG. 8 is a flowchart illustrating processing for detecting a face image.

FIGS. 7 and 8 illustrate another embodiment of the present invention.

In this embodiment, processing is executed to compare the result of detecting a so-called thru-image (an image that prevails at the time of preliminary image sensing) and the result of detecting an image obtained by regular image sensing (an image that has been sensed after the shutter-release button is fully depressed). Further, whereas an image obtained by regular image sensing has a high resolution and a large size (a large amount of data or a large image size), a thru-image has a comparatively low resolution and a small size. In this embodiment, therefore, coordinate transformation processing is executed so as to apply a coordinate transformation and equalize the size of the thru-image and the size of the regular sensed image. Processing is executed to compare the results of detecting the thru-image and the regular sensed image whose sizes have been made the same.

A thru-image α4 is obtained, as shown in FIG. 7. The thru-image α4 includes an image S4 of a person and is subjected to face-image detection processing, whereby a face-image area C4 is detected. Further, regular image sensing is performed to obtain a regular sensed image α6. Since the size of the thru-image α4 and the size of the regular sensed image α6 differ, the thru-image α4 is subjected to a coordinate transformation in such a manner that the size of the thru-image α4 will become the same as the size of the regular sensed image α6. Owing to the coordinate transformation of the thru-image α4, a thru-image α5 having a size the same as that of the regular sensed image α6 is obtained.

The thru-image α5 includes an image S5 of a person and is subjected to face-image detection processing, whereby a face-image area C5 is detected. Further, the regular sensed image α6 also includes an image S6 of a person and is subjected to face-image detection processing, whereby a face-image area C6 is detected. Further, assume that a face-image area C7 other than the face-image area C6 has been detected. It can be understood that the face-image area in the regular sensed image α6 is decided upon as area C6 by comparing the result of detecting the coordinate-transformed thru-image α5 and the result of detecting the regular sensed image α6.

In the example set forth above, the size of the thru-image α4 is made to conform to the size of the regular sensed image α6. It goes without saying, however, that the size of the regular sensed image a6 may be made to conform to the size of the thru-image a4. Both the size of the thru-image α4 and the size of the regular sensed image α6 may be made to conform to a prescribed size.

FIG. 8 is a flowchart illustrating processing for deciding a face-image area from a thru-image and a regular sensed image.

If the image sensing mode is set and a thru-image is obtained by preliminary image sensing, the thru-image is subjected to face-image detection processing (step 41). Since the thru-image is obtained at fixed periods, detection processing is executed for every thru-image obtained at the fixed periods. The results of face detection processing obtained in face detection processing are registered while being updated (step 42). The processing of steps 41 and 42 is repeated until the shutter-release button is fully depressed ("NO" at step 43).

When the shutter-release button is fully depressed ("YES" at step 43), regular image sensing is carried out and a regular sensed image is obtained. The regular sensed image obtained is subjected to face detection processing (step 44).

When the regular sensed image and thru-image (the thru-image that prevailed immediately before the shutter-release button was fully depressed) are obtained, a coordinate transformation is applied so as to make the sizes of these images the same (step 45). The coordinate transformation may be performed so as to achieve conformity with the size of the thru-image, so as to conform to the size of the regular sensed image, or so as to conform to the size of another image. After the coordinate transformation is performed, the result of face detection in the thru-image and the result of face detection in the regular sensed image are compared (step 46). The result of the comparison is registered and the face-image area is decided (step 47).

Figure 9:
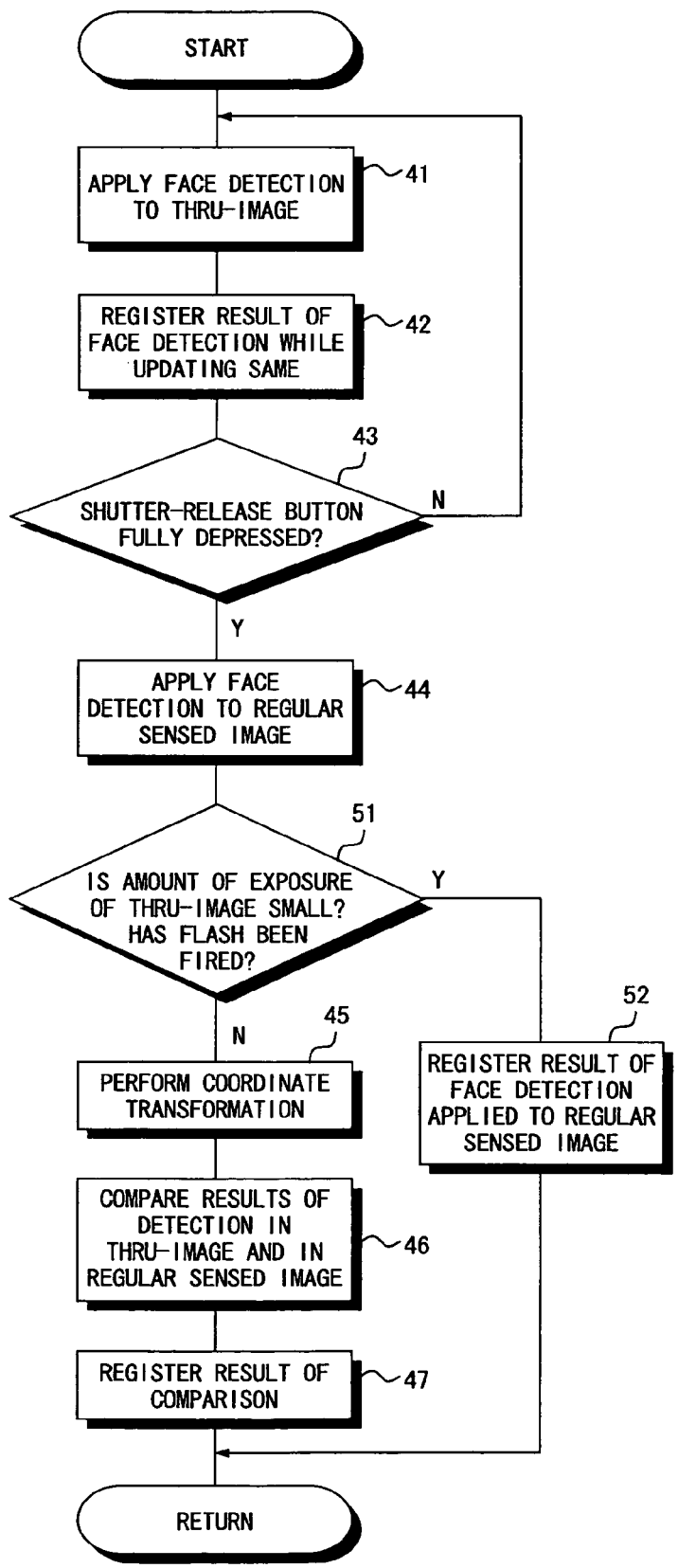
FIG. 9 is a flowchart illustrating processing for detecting a face image.

FIG. 9, which is a modification of FIG. 8, is a flowchart illustrating processing for detecting a face-image area. Processing in FIG. 9 identical with that shown in FIG. 8 is denoted by like step numbers and need not be described again.

In the processing shown in FIG. 9, whether the amount of exposure of the thru-image obtained is small or whether the flash was fired in regular image sensing is checked (step 51). If the flash was fired in regular image sensing, then the amount of exposure of the thru-image obtained is small. If the amount of exposure of the thru-image is small, then the thru-image may be dark and may not be detectable even if face detection processing is executed. Because the face-image area cannot be detected, there may be instances where a face-image area that will be linked does not exist even though the face-image area detected in the thru-image and the face-image area detected in the regular image area are compared in the manner described above. Hence there are instances where a face-image area cannot be decided. In this modification, therefore, if the amount of exposure of the thru-image is small or the flash was fired in original image sensing ("YES" at step 51), then the result of face detection in the regular sensed image is registered and decided upon as the face-image area without executing processing for comparing the above-mentioned results of detection in the thru-image and regular sensed images (step 52).

FIGS. 10A to 10D and FIG. 11 are useful in describing processing for deciding linkage mentioned above.

FIGS. 10A to 10D illustrate examples of fluctuation of a face-image area detected in an immediately preceding subject image and a face-image area detected in the present subject image.

FIG. 10A illustrates a fluctuation in position. This illustrates that a face-image area C8 has been detected in face detection processing applied in an immediately preceding subject image, and that a face-image area C9 has been detected in face detection processing applied in the present subject image.

FIG. 10B illustrates a fluctuation in size. This illustrates that a face-image area C10 has been detected in face detection processing applied in an immediately preceding subject image, and that a face-image area C11 has been detected in face detection processing applied in the present subject image. The size of the face-image area C11 is larger than that of the face-image area C10.

FIG. 10C illustrates a fluctuation in in-plane rotation. This illustrates that a face-image area C12 has been detected in face detection processing applied in an immediately preceding subject image, and that a face-image area C13 has been detected in face detection processing applied in the present subject image. As mentioned above, an area corresponding to the upper portion of the face is indicated by a bold line. Accordingly, it will be understood that the image of the face detected in the present subject image has been rotated by 90°, in the plane of the subject image, from the image of the face detected in the preceding subject image.

FIG. 10D illustrates a fluctuation in out-of-plane rotation. This illustrates that a face-image area C14 has been detected in face detection processing applied in an immediately preceding subject image, and that a face-image area C15 has been detected in face detection processing applied in the present subject image. The face-image area C14 detected in face detection processing applied in the preceding subject image is rectangular, and the face-image area C15 detected in face detection processing applied in the present subject image is pentagonal. It will be understood that the face image is facing forward in the preceding subject image and is facing sideways in the present subject image.

In the case of such fluctuation, linking is performed if the degree of fluctuation is within a fixed range, as will be described next. If linking has been performed, an area, etc., in the vicinity of the detected face-image areas can also be decided upon as the face-image area. For example, as illustrated in FIG. 10A, an area C enclosing the face-image areas C8 and C9 may be decided upon as the face-image area, or the face-image areas C8 and C9 may be decided upon as face-image areas.

FIG. 11 is a flowchart illustrating processing for deciding linkage. In a case where fluctuation described above is within a fixed range, a face-image area detected in face detection processing in a preceding subject image and a face-image area detected in face detection processing in the present subject image are considered to correspond and are linked.

Let a variable j represent the face number of a face-image area detected in the present subject image, and let a variable i represent the face number of a face-image area detected in the preceding subject image.

All face-image areas detected in the present subject image are initialized (steps 61 to 64). To achieve this, the variable j of the present face-image area is reset (step 61) and link initialization processing is repeated while incrementing the variable j until links regarding all face-image areas are initialized ("YES" at step 62; steps 63, 64).

When all face-image areas detected in the present subject image are initialized ("NO" at step 62), the variable j is reset again (step 65) and linking is determined in regard to each and every face-image area detected in the present subject image and each and every face-image area detected in the preceding subject image. Whether linking has been completed with regard to all face-image areas detected in the present subject image is checked (step 66).

If linking is not finished ("YES" at step 66), then a dummy initial value is set as the distance in the above-mentioned fluctuation in position (step 67).

The variable i of the face-image area detected in the preceding subject image is reset (step 68). Since linking is performed with regard to all face-image areas, it is determined whether linking has been completed with regard to all face-image areas (step 69).

If linking regarding all face-image areas has not been completed ("YES" at step 69), then whether a fluctuation in out-of-plane rotation, a fluctuation in in-plane rotation and a fluctuation in size are within prescribed ranges is checked (steps 70 to 72). If all of these types of fluctuation are within the prescribed ranges ("YES" at steps 70 to 72), then it is construed that the amounts of fluctuation are small. A variable d is set to a center-to-center distance in position fluctuation (step 73) and whether the center-to-center distance is smaller than the dummy value is checked (step 74). If it is smaller ("YES" at step 74), the minimum value of the center-to-center distance is set to the center-to-center distance in position fluctuation (step 75). If the set center-to-center distance is within a prescribed range ("YES" at step 76), then a face-image area j in the present subject image is construed as being linked to a face-image area i in the preceding subject image and this is registered as the above-mentioned result of comparison (step 77; see FIG. 5). The variable i is incremented (step 78) and whether linking is to be performed is determined with regard to the next face-image area in the preceding subject image.

Figure 12:
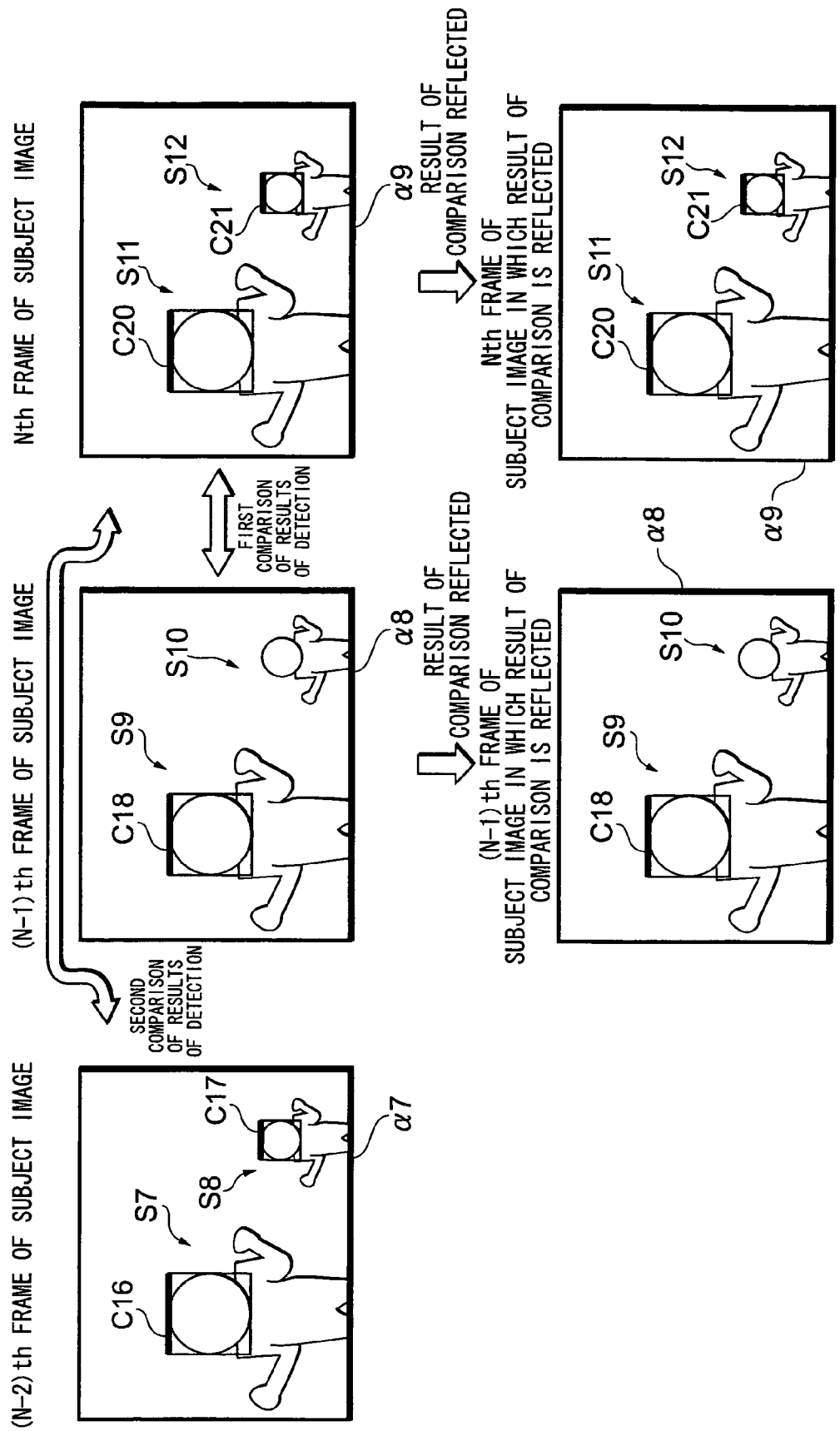
FIG. 12 illustrates examples of images of a subject.

FIG. 12 illustrates examples of images of a subject according to another embodiment.

In this embodiment, three successive frames of subject images are used. Even in a case where a face-image area corresponding to a face-image area detected in the third subject image among the three successive frames of subject images was not present in the second subject image, it is linked and decided upon as a face-image area in the third subject image if it is present in the first subject image.

For example, an (N−2)th frame of a subject image α7, an (N−1)th frame of a subject image α8 and an Nth frame of a subject image α9 are obtained. The (N−2)th frame of the subject image α7 includes images S7 and S8 of persons, and areas C16 and C17 of face images are detected by executing face-image detection processing. The (N−1)th frame of the subject image α8 includes images S9 and S10 of persons. Assume that a face-image area C18 has been detected from the person image S9 but that a face-image area has not been detected from the person image S10 by face-image detection processing. The Nth frame of the subject image α9 includes images S11 and S12 of persons, and areas C20 and C21 of face images are detected by executing face-image detection processing.

Processing is executed to compare the result of detection of the face-image areas C20 and C21 detected in the Nth frame of the subject image α9 and the face-image area C18 detected in the (N−1)th frame of the subject image α8 (this is a first comparison of detection results). Although the face-image area C18 corresponding to the face-image area C20 detected in the Nth frame of the subject image α9 is present in the (N−1)th frame of the subject image α8, a face-image area corresponding to the face-image area C21 detected in the Nth frame of the subject image α9 has not been detected. Therefore, in the embodiment described above, the face-image area C20 is decided upon as a face-image area in the Nth frame of the subject image α9, but the face-image area C21 is not decided upon as a face-image area. In this embodiment, with regard to the unlinked face-image area C21 among the face-image areas detected in the Nth frame of the subject image α9, it is determined whether this one to be linked to a face-image area of the (N−2)th frame of a subject image α7 (this is a second comparison of detection results). In a case where the face-image area C21 that may be linked to the face-image area C17 of the (N−2)th frame of subject image α7 is in the Nth frame of the subject image α9, the face-image area C21 is decided upon as a face-image area in the Nth frame of the subject image α9. The face-image area C21 that could not be detected in the above-described embodiment can be detected in this embodiment.

It will be understood that the face-image area C18 will be decided upon as a face-image area in the (N−1)th frame of the subject image α8 by executing processing to compare the results of detection of the face-image areas C16 and C17 detected in the (N−2)th frame of subject image α7.

Figure 13:
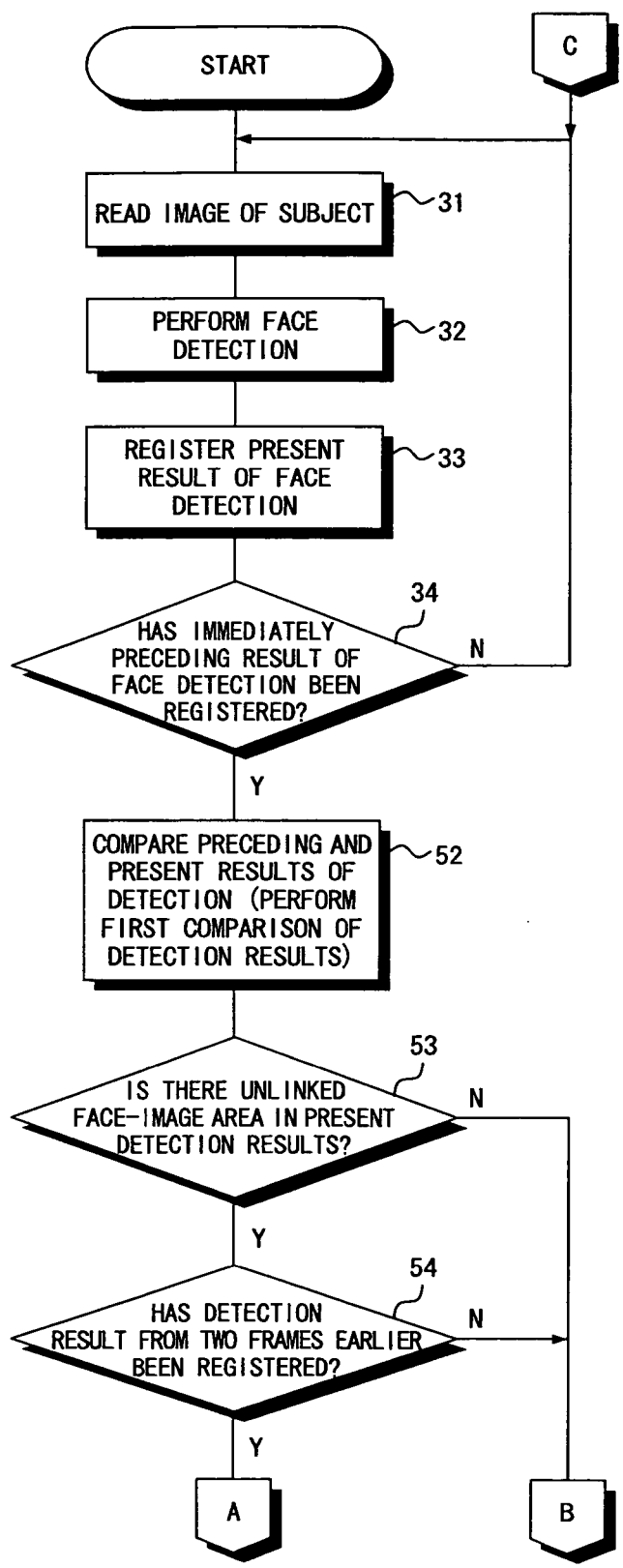
FIG. 13 is a flowchart illustrating processing for detecting a face image.
Figure 14:
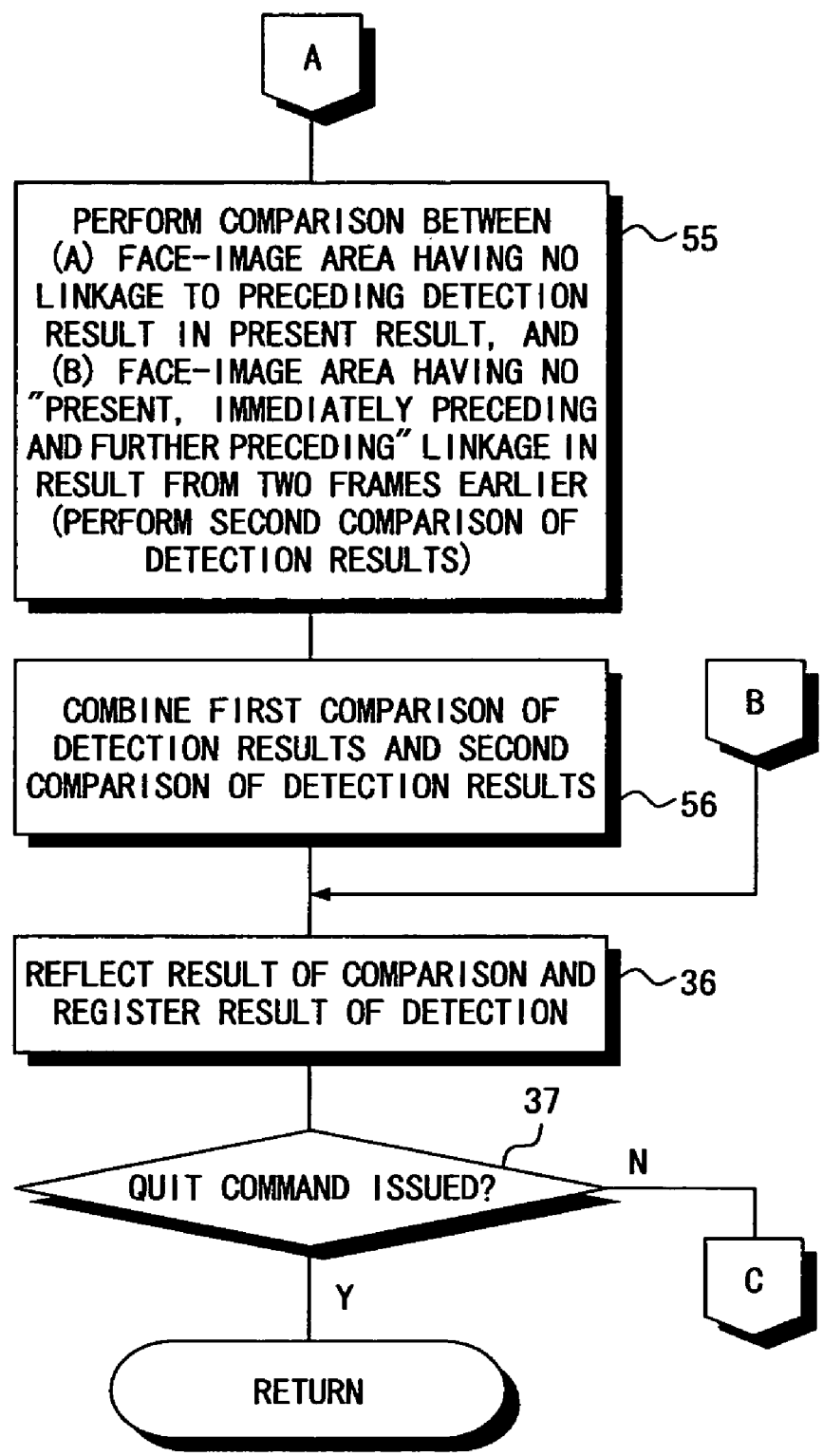
FIG. 14 is a flowchart illustrating processing for detecting a face image.

FIGS. 13 and 14 are flowcharts illustrating the processing of FIG. 12 described above.

The present (Nth frame) of the image of the subject is read (step 31) and face detection processing is executed (step 32). The result of the present face detection processing is registered (step 33). If the immediately preceding [(N−1)th frame] result of face detection has been registered ("YES" at step 34), then, as described above, processing (the first comparison of detection results) for comparing the preceding and present results of detection is executed (step 52).

In the first comparison of detection results, it is determined whether there is an unlinked face-image area among face-image areas detected in the present subject image (step 53). If an unlinked face-image area exists, then it is determined whether a result of detection from two frames earlier [of the (N−2)th frame] has been registered (step 54). If a result of detection from two frames earlier has been registered ("YES" at step 54), then processing (the second comparison of detection results) is executed to compare the results of detection between (A), in the present result of detection, a face-image area having no linkage to the preceding result of detection and (B), in the result of detection from two frames earlier, a face-image area having no "present, immediately preceding and further preceding" linkage (step 55).

The first comparison of detection results and the second comparison of detection results are combined (step 56), the result of the combination of comparisons is reflected and registered as the final present result of detection and the face-image area in the present subject image is decided (step 36). The processing from step 31 onward is repeated until a quit command is issued.

If the present result of detection is that there is no unlinked face-image area ("NO" at step 53), or if the result of detection from two frames earlier has not been registered ("NO" at step 54), then the face-image area in the present subject image is decided based upon the processing for comparing the immediately preceding and present results of detection (step 36).

Figure 15:
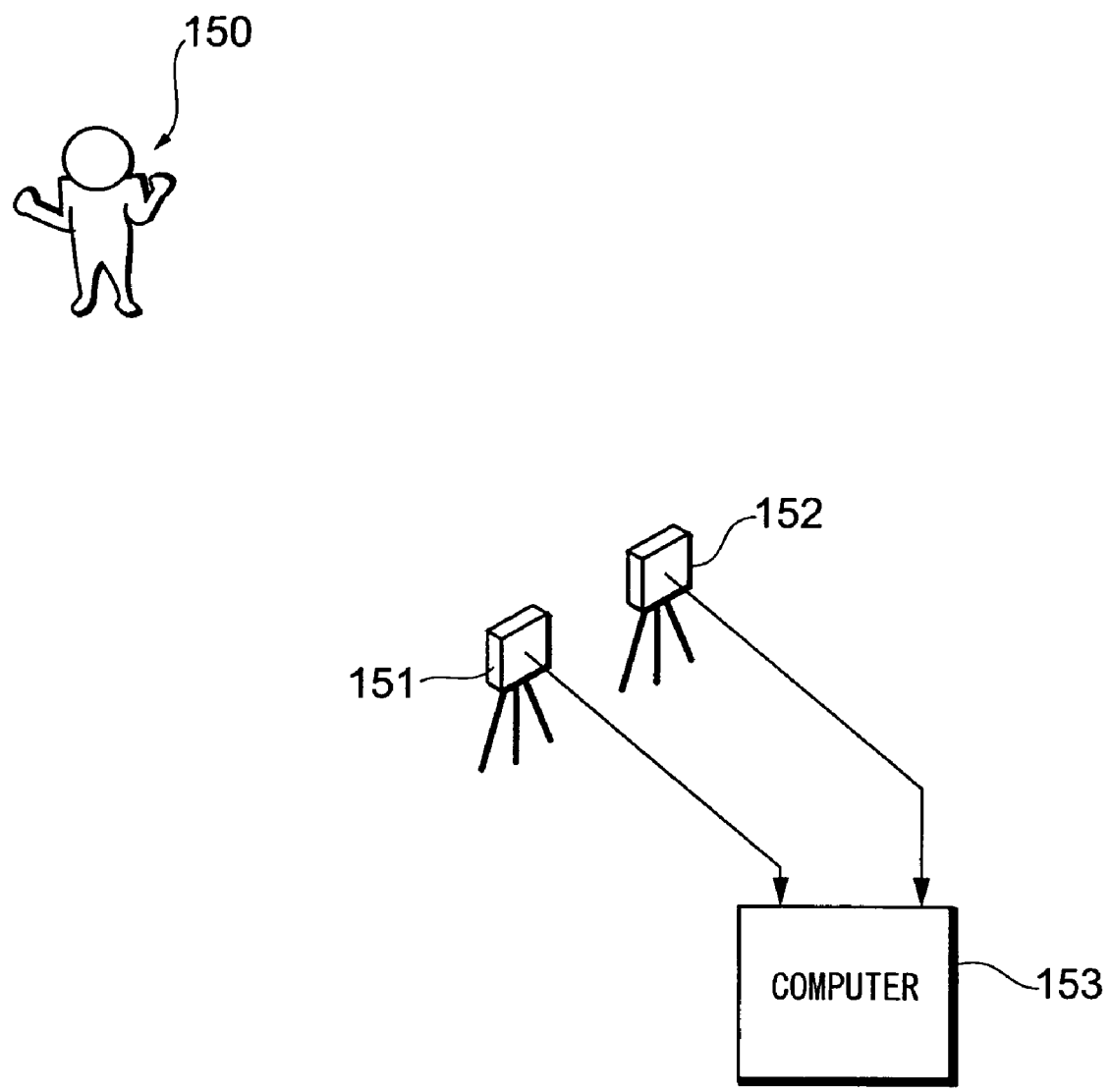
FIG. 15 illustrates the relationship between a subject and image sensing devices.

FIG. 15 illustrates the manner in which the image of a subject 150 is sensed according to another embodiment.

In this embodiment, two digital still cameras 151 and 152 having substantially identical image-sensing ranges are used. Two frames of subject images are obtained by sensing the image of a subject 150 simultaneously or successively using the two digital still cameras 151 and 152. The digital still cameras 151 and 152 are connected to a computer 153. Image data representing the images of the subject sensed by the digital still cameras 151 and 152 are applied to the computer 153. The latter decides the face-image area using the two frames of subject images obtained. Although the two digital still cameras 151 and 152 are illustrated in FIG. 15, two image sensing devices (sensors) will suffice the two image sensing devices may be incorporated within one camera.

Figure 16:
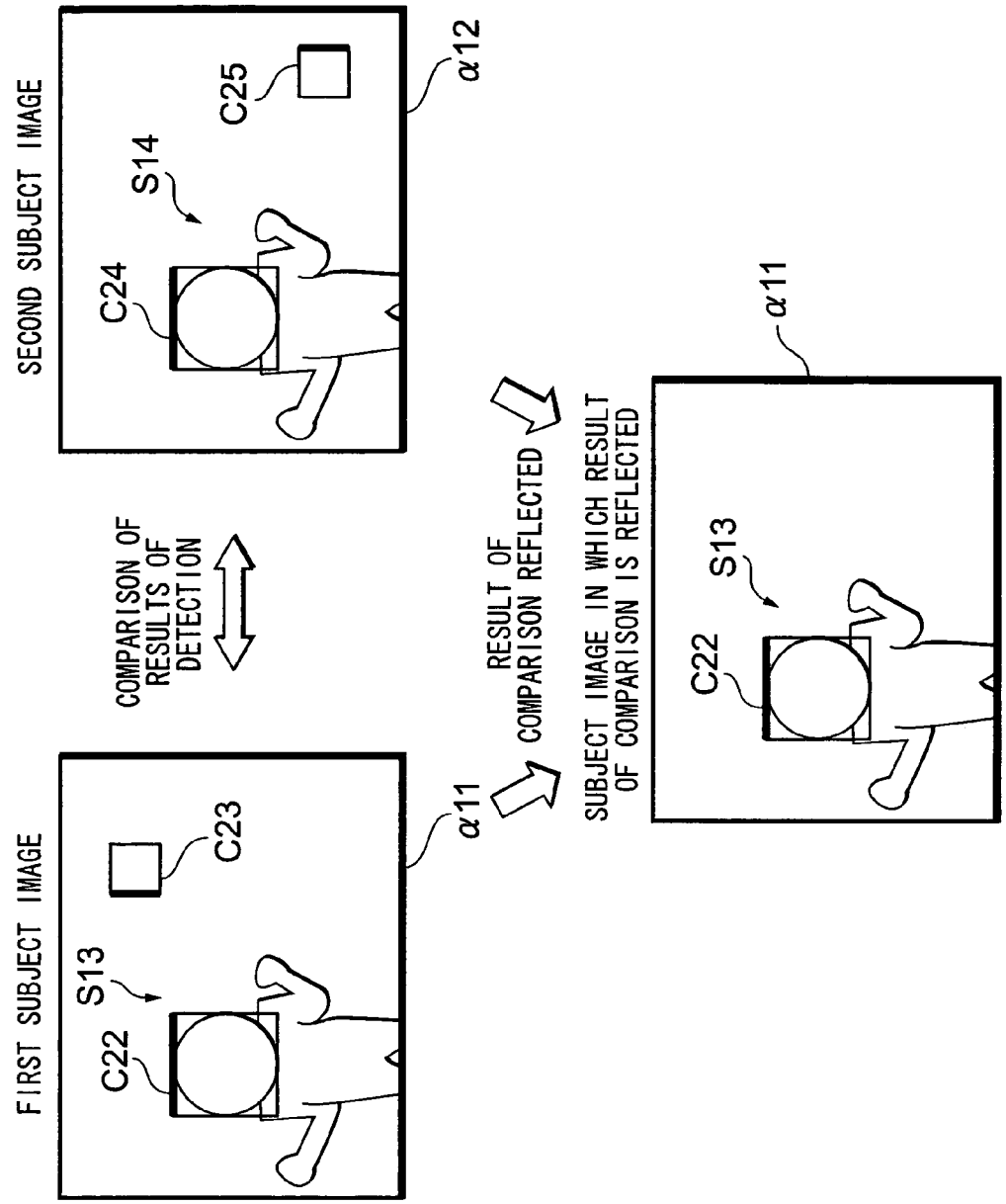
FIG. 16 illustrates examples of images of a subject.

FIG. 16 illustrates examples of subject images, etc., that have been sensed using the digital still cameras 151 and 152 shown in FIG. 15.

The digital still cameras 151 and 152 have identical image-sensing ranges and sense the image of the subject simultaneously, as a result of which a first subject image α11 and a second subject image α12 are obtained. The first subject image α11 includes an image S13 of a person. A face-image area C22 is detected from the image S13 of the person by applying face detection processing to the first subject image α11. A face-image area C23 also is detected in the first subject image α11. The second subject image α12 includes an image S14 of a person. A face-image area C24 is detected from the image S14 of the person by applying face detection processing to the second subject image α12. A face-image area C25 also is detected in the second subject image α12.

The face-image areas C22 and C24 become linked owing to execution of processing for comparing the results of detection of face-image areas detected in the first subject image α11 and of face areas detected in the second subject image α12. Accordingly, the face-image area in the first subject image α11 (or in the second subject image α12) is decided to be the face-image area C22 of the image S13 of the person.

Figure 17:
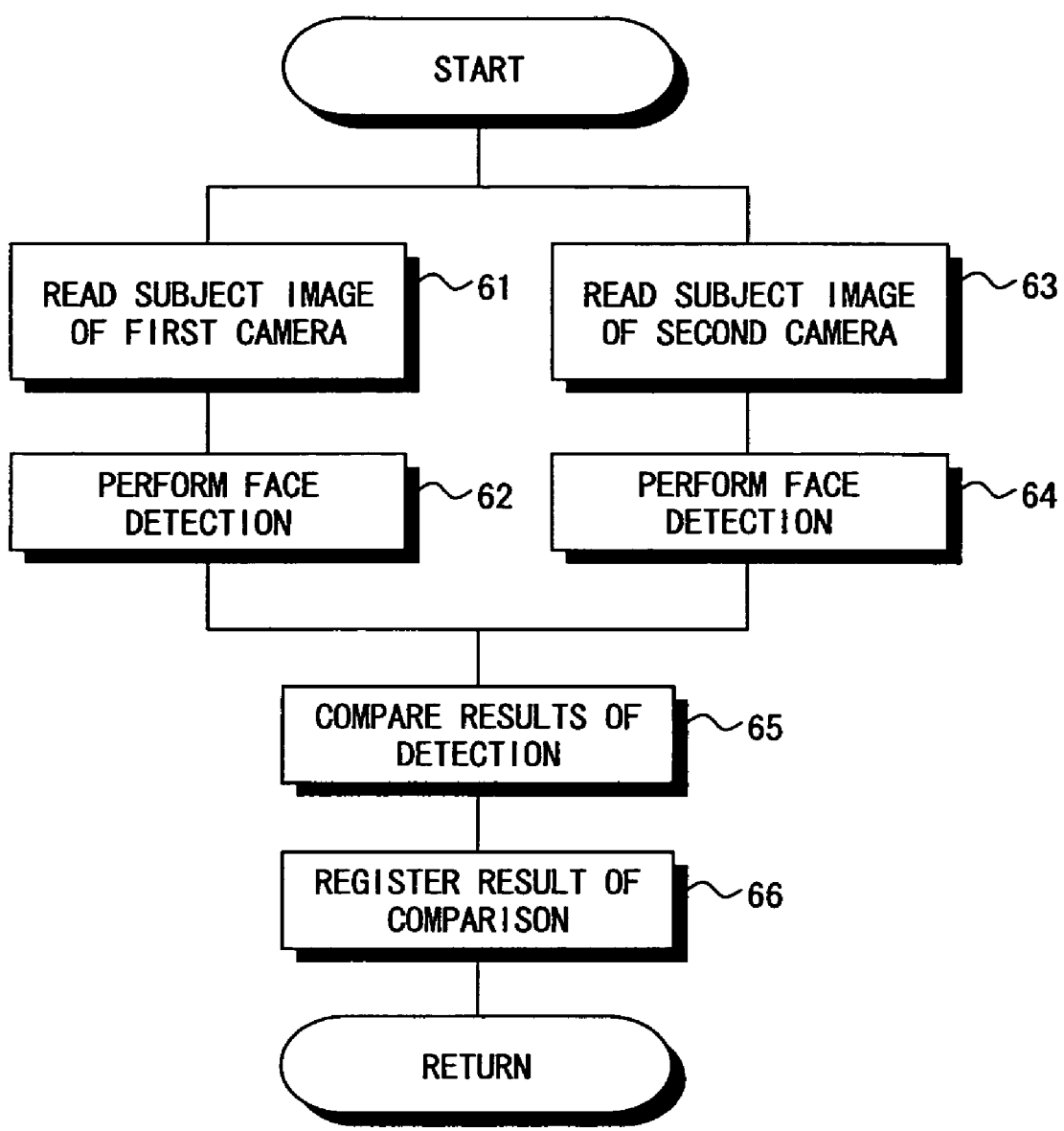
FIG. 17 is a flowchart illustrating processing for detecting a face image.

FIG. 17 is a flowchart illustrating processing for deciding a face-image area using the first subject image α11 and the second subject image α12.

A first subject image and a second subject image are obtained by sensing the image of a subject simultaneously using the first digital still camera 151 and the second digital still camera 152. The first and second subject images are read (steps 61, 63). Processing (step 62) for detecting a face image in the read first subject image is executed in parallel with processing (step 64) for detecting a face image in the read second subject image.

Processing is executed to compare the result of face-image detection processing in the first subject image and the result of face-image detection processing in the second subject image (step 65). The results of comparison are reflected and registered as the result of detection.

Figure 18:
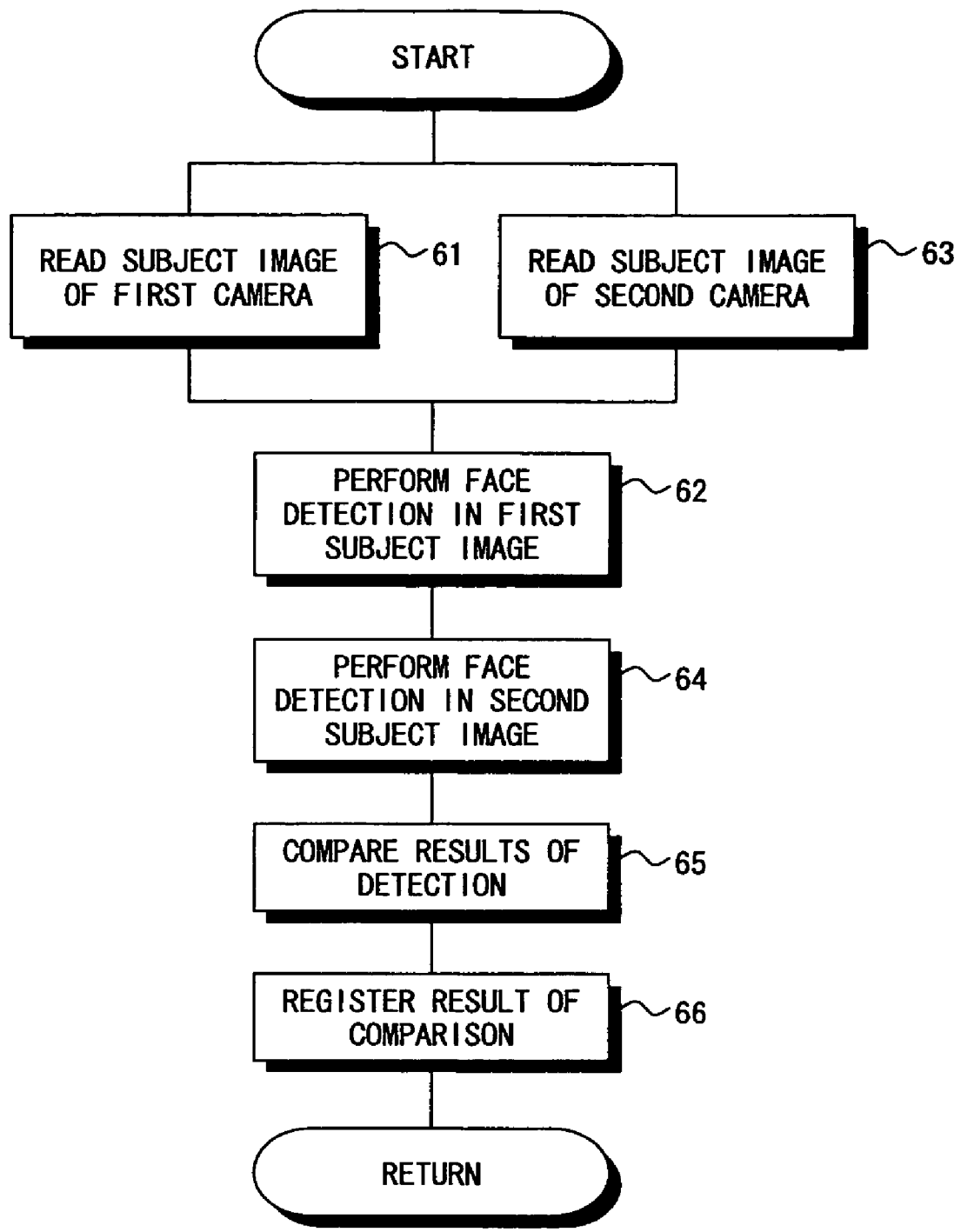
FIG. 18 is a flowchart illustrating processing for detecting a face image.

FIG. 18 is a flowchart illustrating a modification of the processing shown in FIG. 17. Processing in FIG. 17 identical with that shown in FIG. 17 is denoted by like step numbers and need not be described again.

The first and second subject images are obtained (steps 61, 63). In the processing illustrated in FIG. 17, the processing for detecting a face image in the first subject image is executed in parallel with processing for detecting a face image in the second subject image. In this modification, however, processing for detecting a face image in the first subject image is executed first (step 62), then processing for detecting a face image in the second subject image is executed (step 64). This is followed by executing processing for comparing the results of detection (step 65) and registration of the results of detection (step 66).

FIGS. 19A to 22B, which are other modifications, illustrate subject images.

FIGS. 19A and 19B illustrate subject images obtained by sensing the image of the subject simultaneously using the first digital still camera 151 and second digital still camera 152 whose image-sensing ranges coincide partially but not completely.

A subject image α13 shown in FIG. 19A includes images S15 and S16 of persons. The score of the face portion of the person image S15 resulting from face detection processing is 8, and the score of the face portion of the person image S16 resulting from face detection processing is 4. A subject image α14 shown in FIG. 19B includes images S17 and S18 of persons. The score of the face portion of the person image S17 resulting from face detection processing is 4, and the score of the face portion of the person image S18 resulting from face detection processing is 6. The person images S16 and S17 are the result of sensing the image of the same person.

FIGS. 20A to 20C illustrate how a face-image area is decided in a case where scores have been obtained in FIGS. 19A and 19B in the manner described above.

According to this method, the determination of a face-image area is made upon individually discriminating the scores detected in the subject images α13 and α14. As shown in FIGS. 20A and 20B, the face-image portion of the person image S15 having score 8 and the face-image portion of the person image S18 having score 6 have high scores (a score threshold value for deciding a face image is a score of 5) and therefore face-image areas C25 and C26 are determined. The person images S16 and S17 having the score of 4 are not deemed to be face-image areas because their scores are too low.

The same portions of the subject images α13 and α14 in which face-image areas have thus been detected are superimposed (subjected to a coordinate transformation) and a combined subject image α17 shown in FIG. 20C is obtained. It goes without saying that the positional relationship between the digital still cameras 151 and 152 has been set in the computer 153 in order that the coordinate transformation may be made.

Figure 21A:
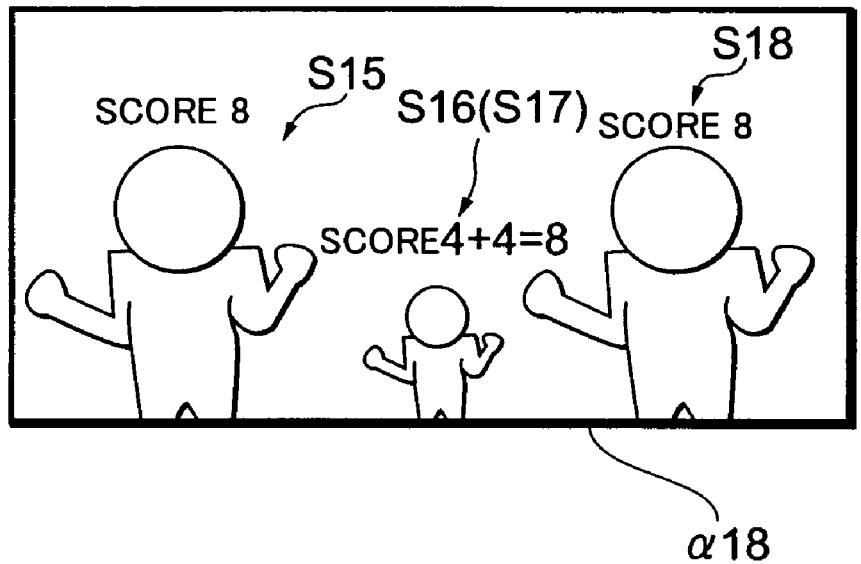
FIGS. 21A and 21B illustrate examples of combined images.
Figure 21B:
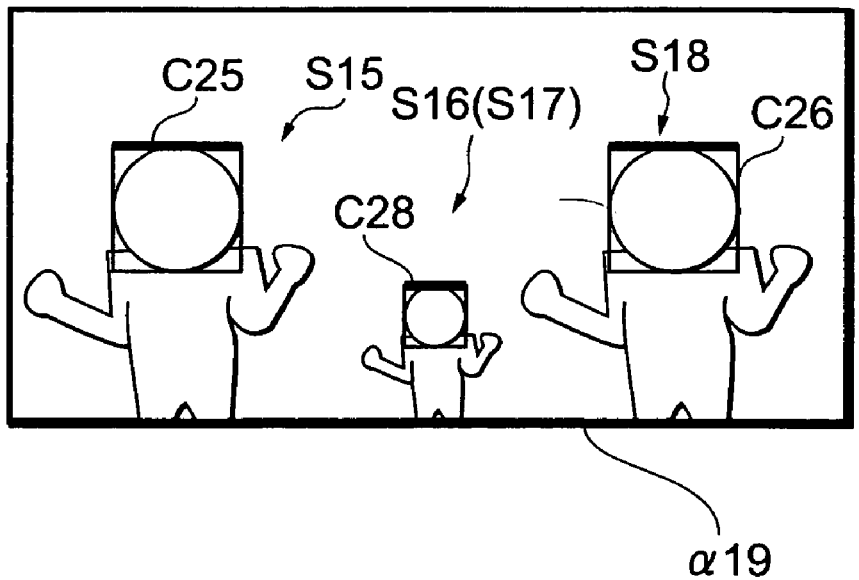

FIGS. 21A and 21B are combined subject images α18 and α19 obtained by superimposing identical portions of the subject images α13 and α14.

As shown in FIG. 21A, the score of the face-image portion of the person image S15 is 8. The score of the face-image portion of the person image S16 is 8, which is obtained by adding the score 4 of the face image S16 in the subject image α13 and the score 4 of the person image S17 in the subject image α14, as illustrated in FIGS. 20A and 20B.

Since the face-image portion of the person image S16 has a score of 8, it is decided upon as face-image area C28, as shown in FIG. 21B.

Figure 22:
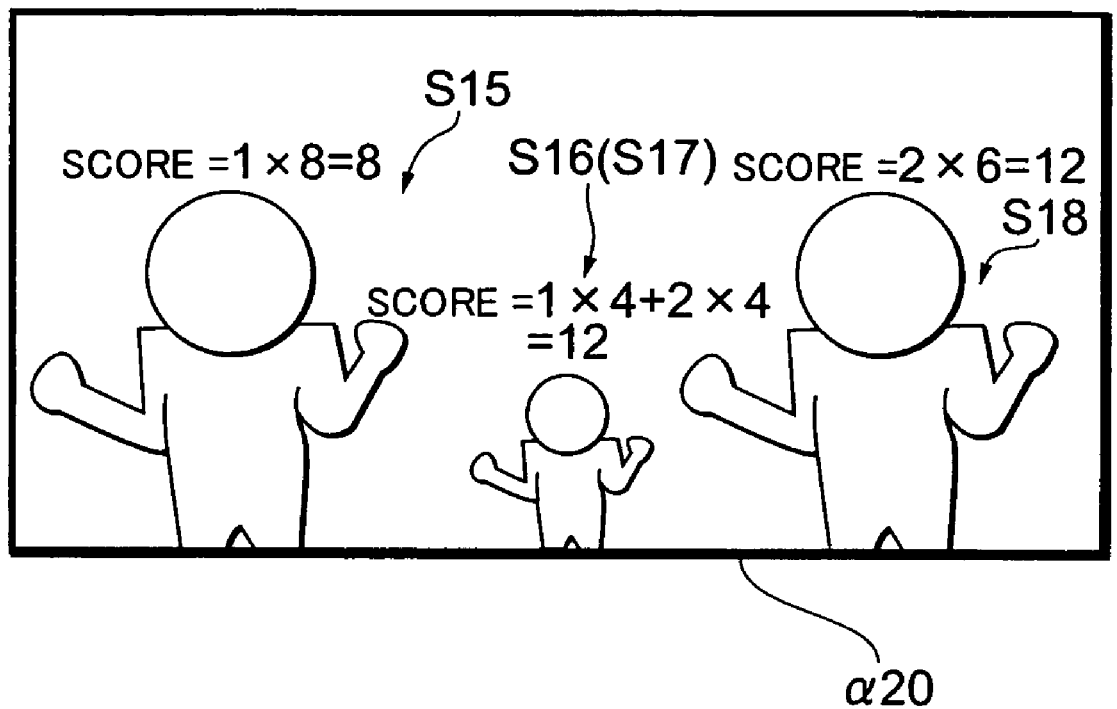
FIG. 22 illustrates an example of a combined images.

FIG. 22 illustrates a combined subject image α20 obtained by superimposing identical portions of the subject image α13 and α14.

The determination concerning a face-image area is made after weighting is applied using a weighting coefficient. A score obtained by face detection is adopted as a provisional score, and the result of multiplying the provisional score by the weighting coefficient is adopted as the score. The weighting coefficient of the face-image portion of person image S15 is 1 and the provisional score thereof is 8 and the score thereof is 8. The score of the face-image portion of the person image S16 is 12, which is the sum of a value obtained by multiplying the provisional score 4 of the person image S16 in the subject image α13 by a weighting coefficient 1, and a value obtained by multiplying the provisional score 4 of the person image S17 in the subject image α14 by a weighting coefficient 2, as illustrated in FIGS. 20A and 20B. The weighting coefficient of the face-image portion of face image S18 is 2, the provisional score thereof is 6 and the score thereof is 12.

If the score threshold value for determining a face-image area is 7.5, all of the scores will be greater than this score threshold value and therefore it is decided that the face-image areas of person images S15, S16 and S18 are face-image areas C25, C28 and C26, respectively, as illustrated in FIG. 21B.

FIG. 23 illustrates an example of the photoreceptor surface of a single-chip image sensor.

An R-filter (indicated by R) that transmits a red light component, a G-filter (indicated by G) that transmits a green light component and a B-filter (indicated by B) that transmits a blue light component are arrayed systematically at a fixed period on the photoreceptor surface of the single-chip image sensor.

The light component transmitted by the R-filter is opto-electronically converted to thereby obtain a red signal component. A subject image of the red signal component is obtained, as illustrated in FIG. 24A, owing to the red signal component obtained. Similarly, the light component transmitted by the G-filter is opto-electronically converted to thereby obtain a green signal component. A subject image of the green signal component is obtained, as illustrated in FIG. 24B, owing to the green signal component obtained. The light component transmitted by the B-filter is opto-electronically converted to thereby obtain a blue signal component. A subject image of the blue signal component is obtained, as illustrated in FIG. 24C, owing to the blue signal component obtained.

A face-image area can be decided by executing face-image detection processing as illustrated in FIG. 16 using two subject images from among the subject images of the red, green and blue signal components thus obtained.

Figures 25A, 26A:
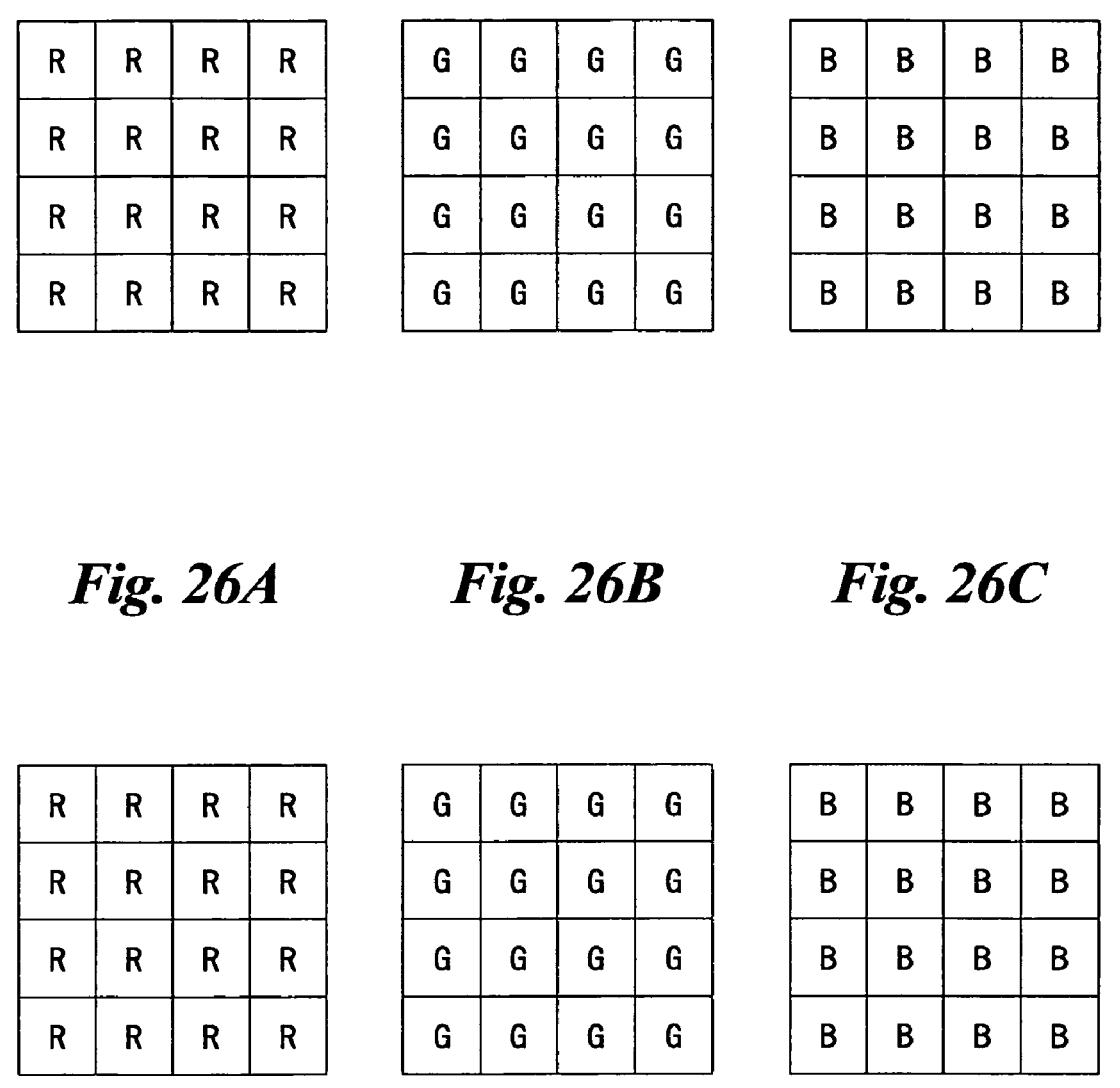

FIGS. 25A, 25B and 25C represent subject images of red, green and blue signal components, respectively, that have undergone interpolation processing. It may be so arranged that a face-image area is decided by executing face-image detection processing as shown in FIG. 16 using two subject images from among three subject images that have undergone interpolation processing in the manner of these images.

FIGS. 26A, 26B and 26C illustrate photoreceptor surfaces of a three-chip solid-state electronic image sensing element. The three-chip solid-state electronic image sensing element produces a subject image of a red signal component shown in FIG. 26A, a subject image of a green signal component shown in FIG. 26B and a subject image of a blue signal component shown in FIG. 26C, these being obtained from respective ones of the image sensors constituting the three-chip solid-state electronic image sensing element. A face-image area can be decided by executing face-image detection processing as shown in FIG. 16 using two subject images from among the three subject images obtained.

FIG. 27A illustrates the photoreceptor surface of a visible-light sensor (image sensing element) and FIG. 27B illustrates the photoreceptor surface of an infrared sensor.

With reference to FIG. 27A, an R-filter, G-filter and B-filter are arrayed systematically at a fixed period on the visible-light sensor in a manner similar to that of the single-chip image sensor shown in FIG. 23. IR filters that transmit a light component in the infrared region are provided on the infrared sensor, as shown in FIG. 27B. A face-image area can also be decided by executing face-image detection processing as shown in FIG. 16 using two subject images, namely a visible-light image represented by a video signal that has been output from the visible-light sensor having the photoreceptor surface shown in FIG. 27A, and an infrared image represented by a video signal that has been output from the infrared sensor having the photoreceptor surface shown in FIG. 27B.

FIG. 28 illustrates the photoreceptor surface of a visible-light/infrared sensor.

R-, G-, B-filters and IR filters are arrayed systematically at a fixed period on the photoreceptor surface of a visible-light/infrared sensor. A subject image represented by a red-component video signal, a subject image represented by a green-component video signal, a subject image represented by a blue-component video signal and a subject image represented by an infrared-component video signal are obtained from the visible-light/infrared sensor. A face-image area can also be decided by executing face-image detection processing as shown in FIG. 16 using two subject images from among these four subject images.

In a case where the image of the subject is sensed using different image sensing devices (image sensing element and sensor) to thereby obtain first and second subject images and detect a face-image area in the manner described above, a face-image area may be decided based upon the sum of a first score of face-image likeliness obtained by face detection processing executed in the first subject image and a second score of face-image likeliness obtained by face detection processing executed in the first subject image, or a face-image area may be decided by weighting the sum of the first and second scores, or the first and second scores may be weighted and a face-image area may be decided based upon a sum of the weighted scores. Of course, these types of processing for deciding a face-image area may be combined to decide the face-image area.

Figure 29:
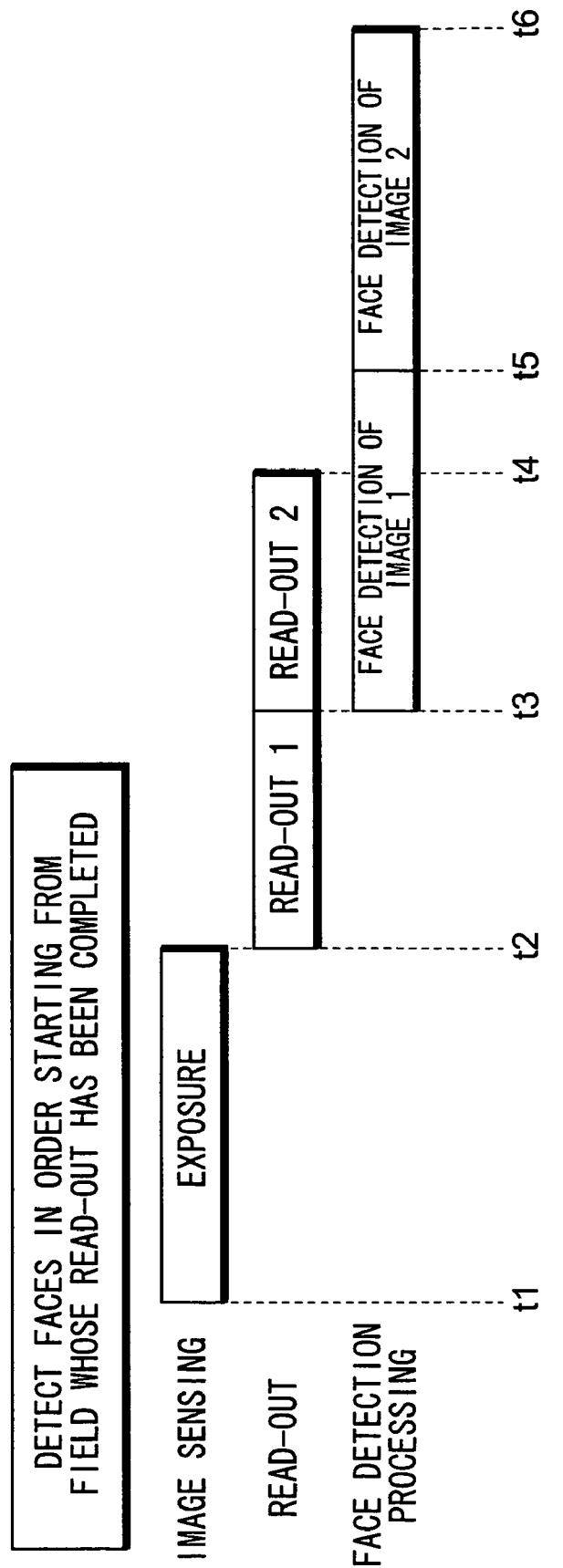
FIG. 29 is a time chart illustrating processing for reading out field images and detecting a phase image.
Figure 30:
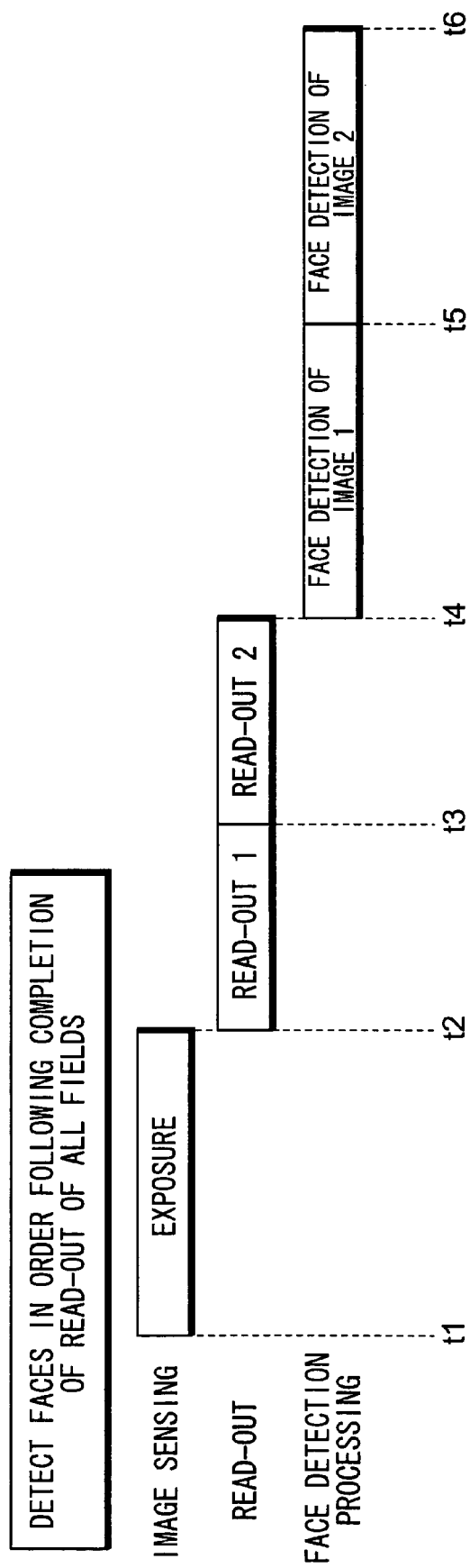
FIG. 30 is a time chart illustrating processing for reading out field images and detecting a phase image.
Figure 31:
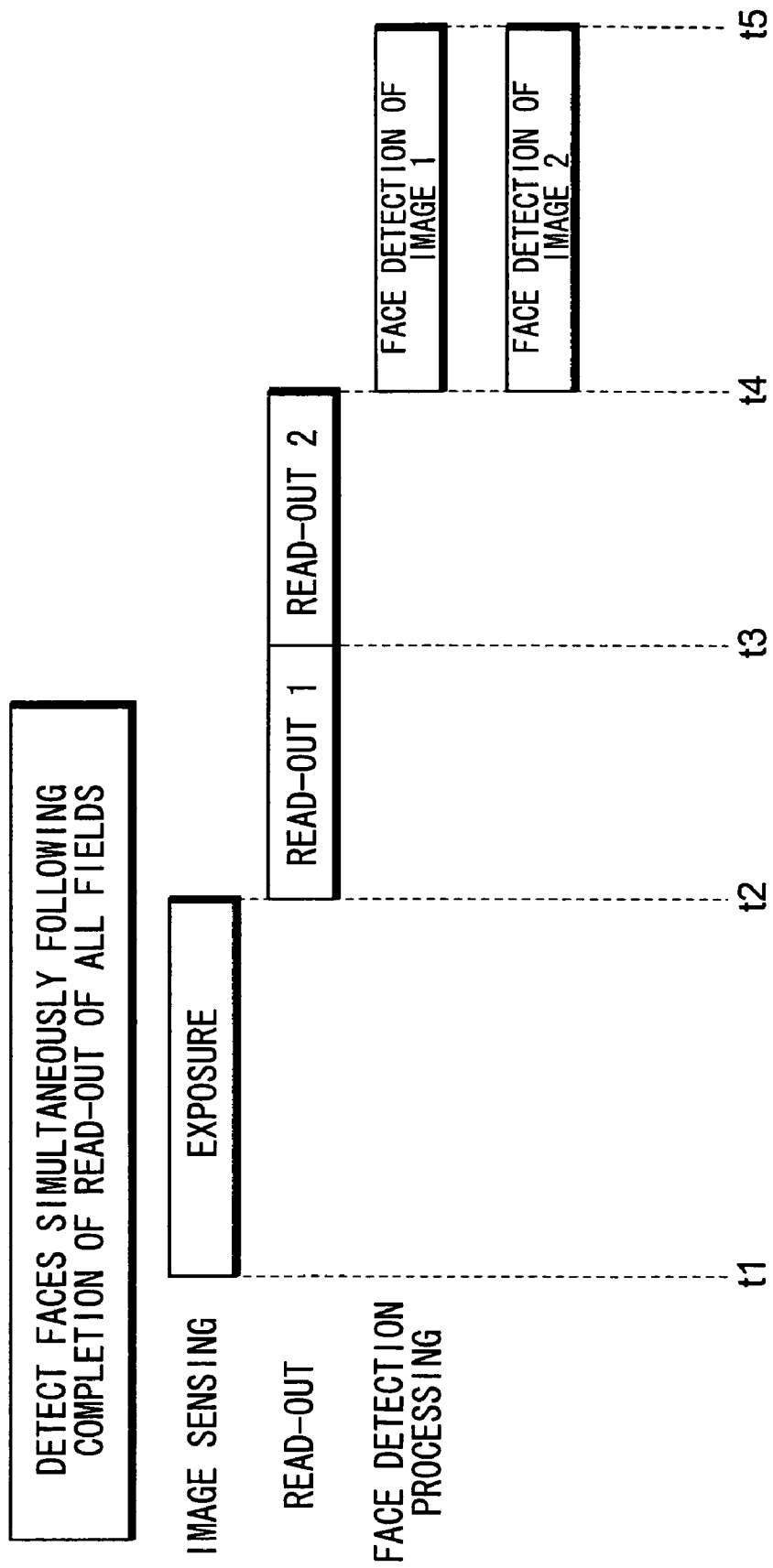
FIG. 31 is a time chart illustrating processing for reading out field images and detecting a phase image.

FIGS. 29 to 31 are time charts illustrating the timings of various operations in face-image detection processing. A first field of a subject image and a second field of a subject image are obtained alternatingly by interlace scanning in a solid-state electronic image sensor. The image of the subject is sensed by performing exposure over a time period of times t1 to t2 in all cases. Read-out of a video signal representing the first field of the subject image is performed over a time period of times t2 to t3, and read-out of a video signal representing the second field of the subject image-is performed over a time period of times t3 to t4.

A face-image area can be decided by executing face-image detection processing as shown in FIG. 16 using the first and second fields of the subject image obtained.

In FIG. 29, processing for detecting a face image is executed in order starting from the subject image of the field whose read-out has been completed.

Read-out of the second field of the video signal starts from time t3 and processing for detecting a face image in the first field of the subject image is executed as well. Read-out of the second field of the video signal ends at time t4 and processing for detecting a face image in the first subject image ends at time t5. Processing for detecting a face image in the second subject image ends at time t6 that follows the end of read-out of the second field of the video signal. The time required for end of face-image detection processing of the two subject images is shortened.

In FIG. 30, processing for detecting a face image is executed in order following completion of read-out of the video signals representing all fields of the subject images.

When read-out of the first field of the video signal ends at time t3, read-out of the second field of the video signal starts and ends at time t4. Face-image detection processing of the first subject image starts at time t4, which is when read-out of the first field of the video signal and read-out of the second field of the video signal are both completed, and ends at time t5. Face-image detection processing of the second subject image starts at time t5 and ends at time t6. Since read-out processing is executed in a time frame that differs from that of face-image detection processing, the processing load on the apparatus is alleviated.

In FIG. 31, face-image detection in two subject images is executed simultaneously following completion of read-out of the video signals representing all fields of the subject images.

Read-out of the first field of the video signal and read-out of the second field of the video signal end in order by time t4. Face-image detection in the first subject image is executed in parallel with face-image detection in the second subject image from time t4 to time t5.

Figure 32:
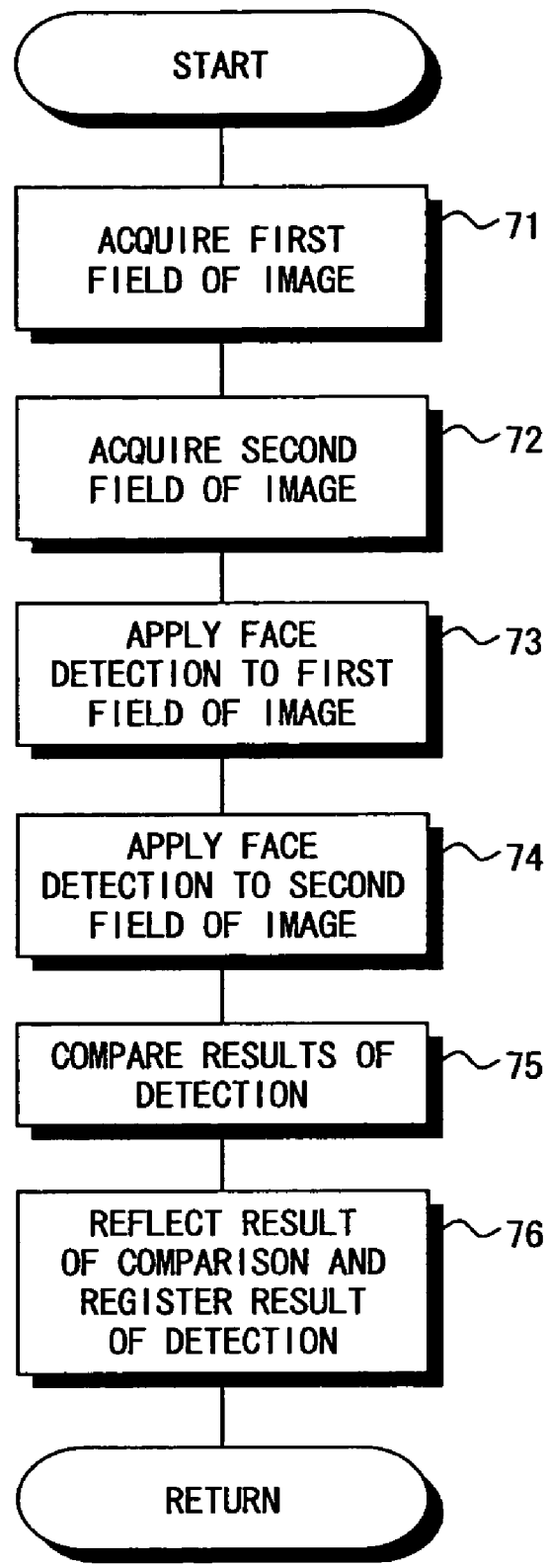
FIG. 32 is a flowchart illustrating processing for detecting a face-image area.

FIG. 32 is a flowchart illustrating processing for detecting a face image from a first field of a subject image and a second field of a subject image.

The first field of a subject image and a second field of a subject image are acquired (steps 71, 72), face-image detection processing is applied to the first field of the subject image (step 73) and face-image detection processing is applied to the second field of the subject image (step 74).

The results of detection obtained by face-image detection processing are compared (step 75) and a result of detection that reflects the result of the comparison is registered (step 76).

Figure 33:
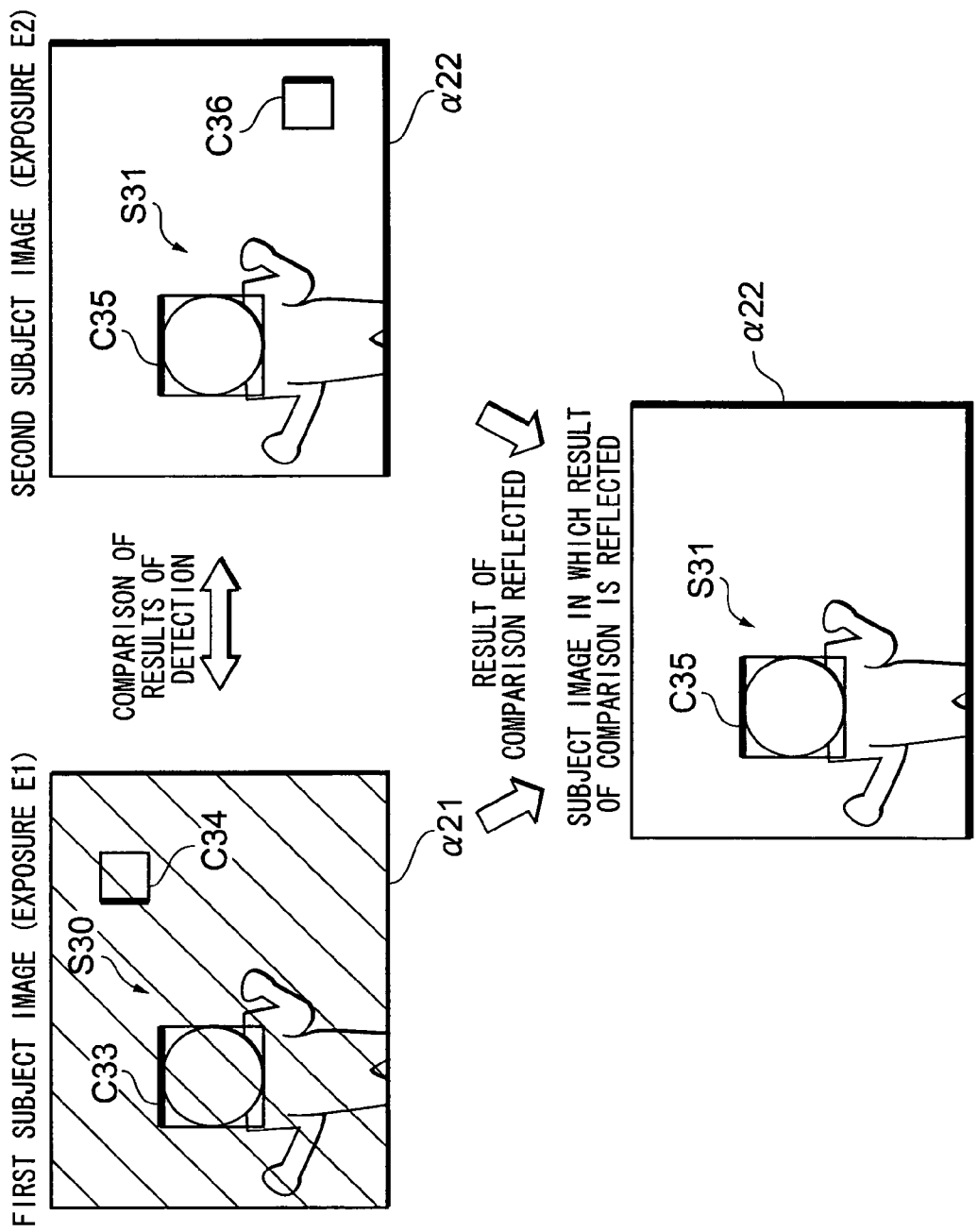
FIG. 33 illustrates examples of subject images.

FIG. 33 illustrates subject images, etc., obtained by so-called bracket image sensing according to another embodiment.

A somewhat dark first subject image α21 is obtained by sensing the image of the subject upon setting a comparatively small amount of exposure E1 (the fact that the image is dark is indicated by hatching). The first subject image α21 includes an image S30 of a person. The face-image portion of the person image S30 is detected as a face-image area C33 by applying face-image detection processing to the first subject image α21. A face-image area C34 also is detected.

Next, a bright second subject image α22 is obtained by sensing the image of the same subject upon setting a comparatively high exposure E2. The second subject image α22 also includes a person image S31 that corresponds to the person image S30 of the first subject image α21. The face-image portion of the person image 31 is detected as a face-image area C35 by applying image detection processing to the second subject image α22. A face-image area C36 also is detected.

The face-image area C35 of the second subject image α22 is decided as the face-image area by executing processing to compare the result of detection of the face-image area in the first subject image α21 and the result of detection of the face-image area in the second subject image α22. It will be understood that the face-image area C34 detected in the first subject image a21 and the face-image area C36 detected in the second subject image a22 are not handled as face-image areas.

Figure 34:
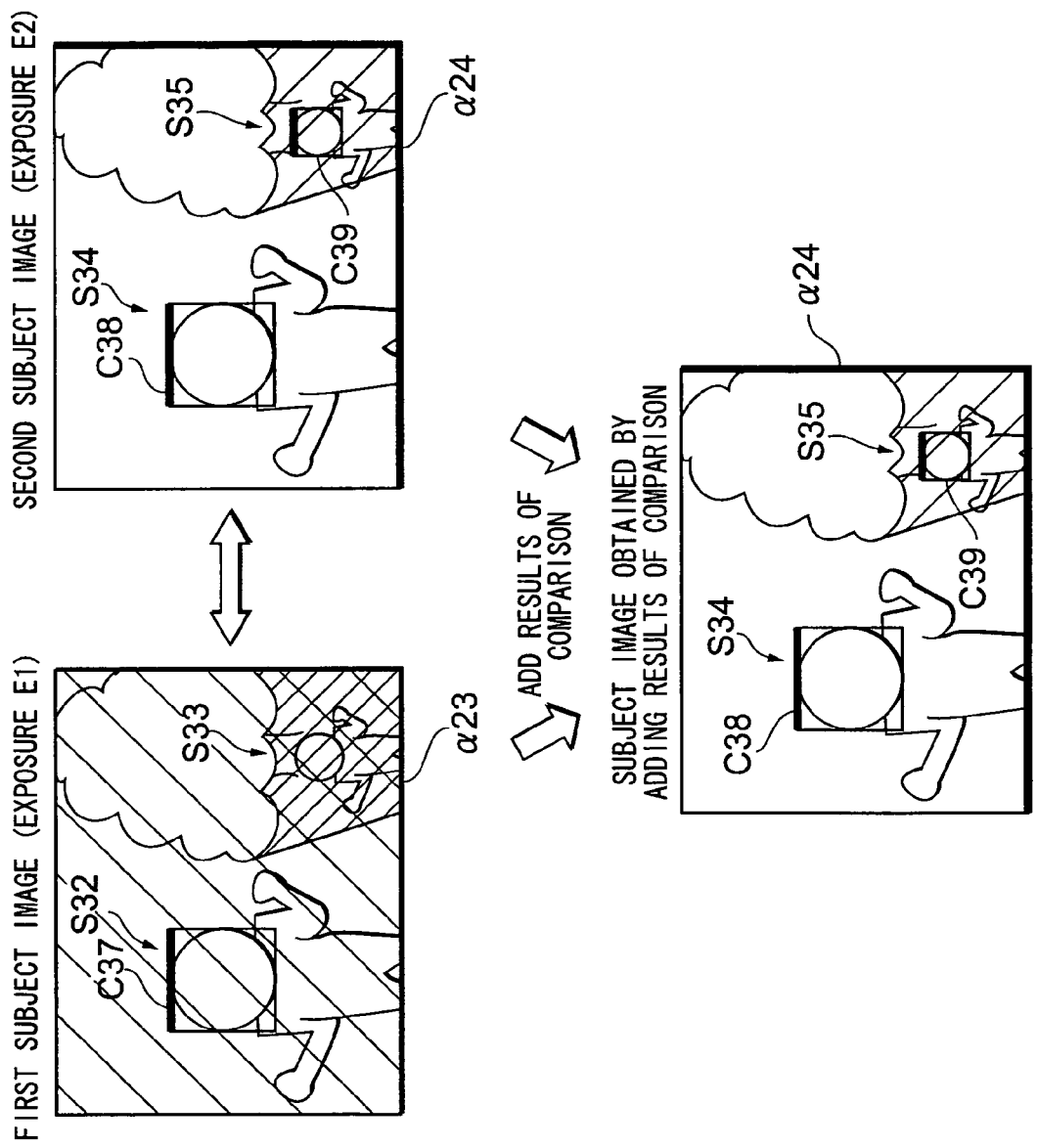
FIG. 34 illustrates examples of subject images.

FIG. 34 illustrates subject images, etc., obtained by so-called image sensing in a case where a subject includes a dark portion.

A somewhat dark first subject image α23 is obtained, as set forth above, by sensing the image of subject upon setting a comparatively small amount of exposure E1. The first subject image α23 includes an image S32 of a person and an image S33 of a person present in the shade of a tree. The face-image portion of the person image S32 is detected as a face-image area C37 by applying face-image detection processing to the first subject image α23. However, since the person image S33 is in the shade of a tree, the face-image portion of the person image S33 is not detected as a face-image area.

A bright second subject image α24 is obtained by sensing the image of the same subject upon setting a comparatively high exposure E2. The second subject image α24 also includes person images S34 and S35 that correspond to the person images S32 and S33, respectively, contained in the first subject image α23. Since the portion in which the person image S35 is present is not very dark, the face-image portion of the person image S34 and the face-image portion of the person image S35 are detected as face-image areas C38 and C39, respectively, by applying face-image detection processing to the second subject image α24.

By halting the above-described processing for comparing results of detection and adding all of the detected face-image areas C37, C38 and C39, a face-image area that could not be detected in the first subject image α23 can be detected as the face-image area C39.

Figure 35:
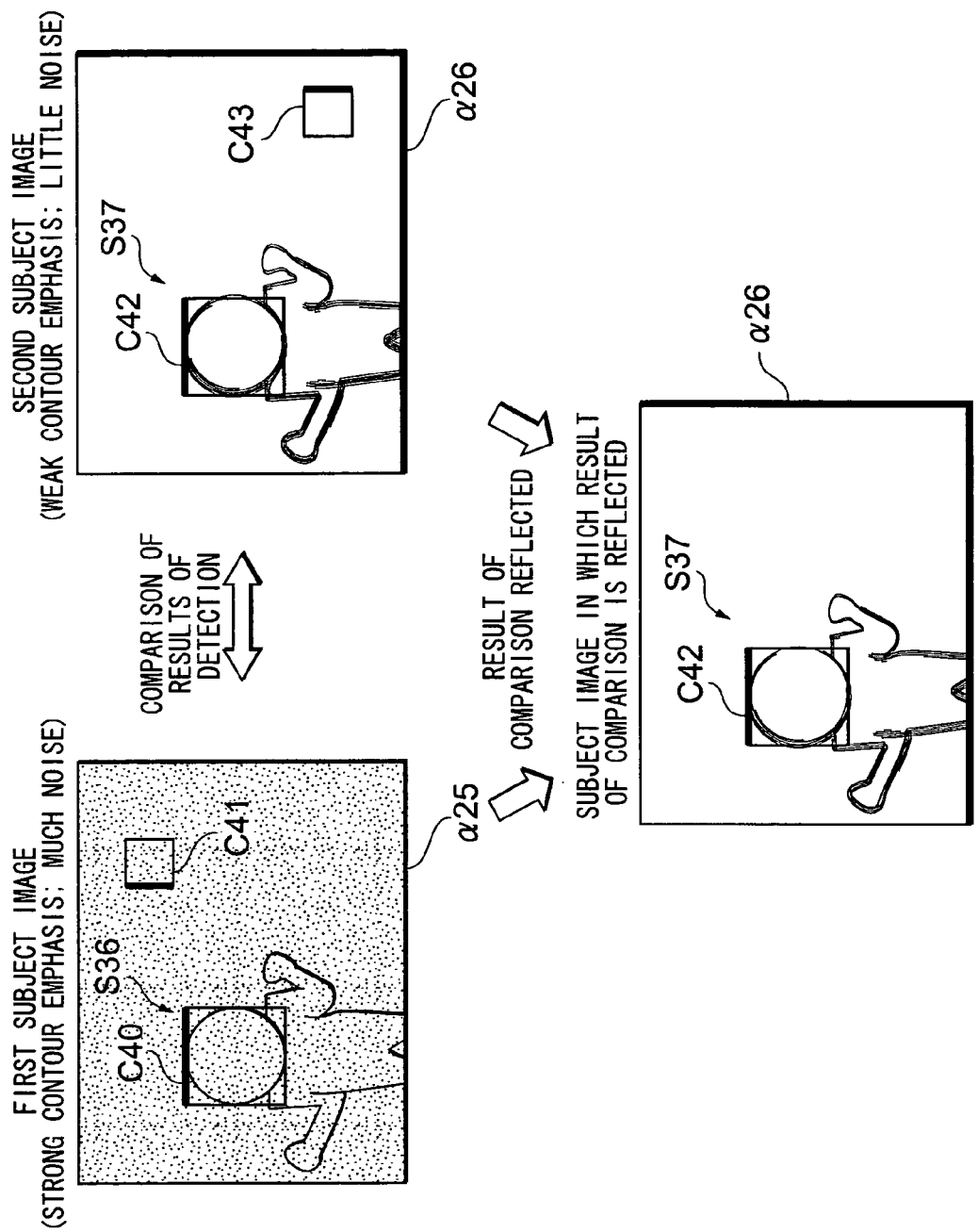
FIG. 35 illustrates examples of subject images.

FIG. 35 illustrates subject images, etc., obtained by changing signal processing.

A first subject image α25 contains a great deal of noise owing to heavy application of contour emphasis processing. The first subject image α25 includes an image S36 of a person, and the face-image portion is detected as a face-image area C40 by applying face-image detection processing. A face-image area C41 also is detected.

A second subject image α26 contains little noise owing to light application of contour emphasis processing. The second subject image α26 also includes a person image S37 that corresponds to the person image S36 contained in the first subject image α25. The face-image portion of the person image S37 is detected as a face-image area C42 by applying face-image detection processing to the second subject image α26. A face-image area C43 also is detected.

The face-image area C42 is decided as the face-image area by comparing the result of detecting the face image in the first subject image α25 and the result of detecting the face image in the second subject image α26.

Figure 36:
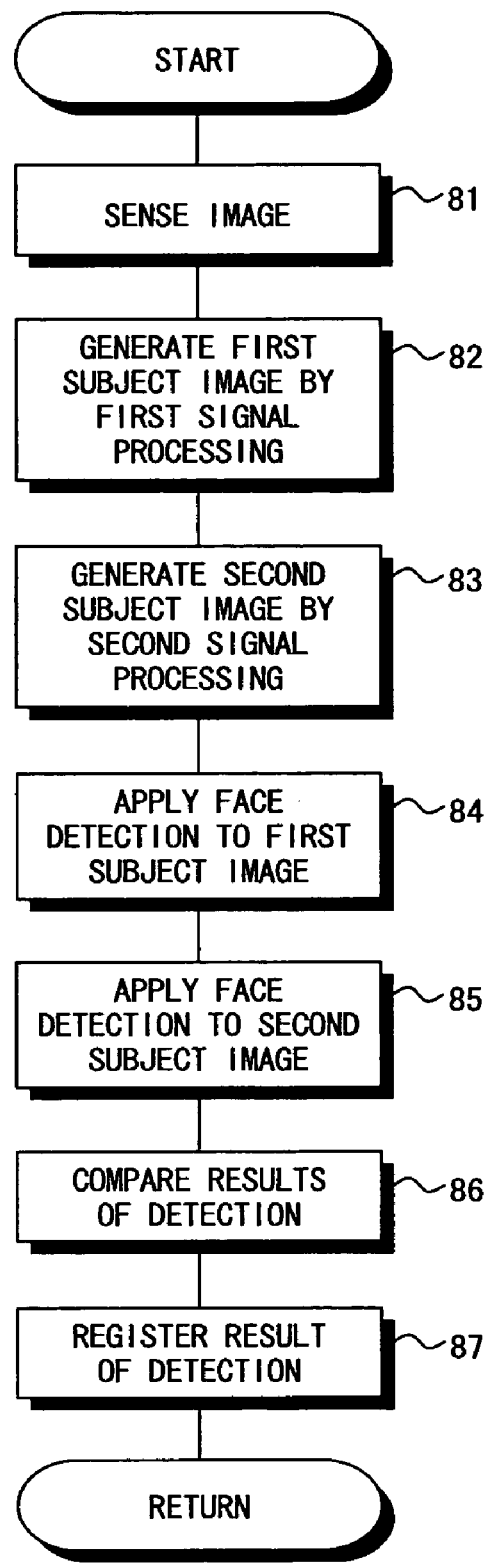
FIG. 36 is a flowchart illustrating processing for detecting a face-image area.

FIG. 36 is a flowchart illustrating processing in a case where face-image detection processing is applied to two subject images obtained by different types of signal processing.

The image of the subject is sensed (step 81), a first subject image is obtained by applying first signal processing to the subject image obtained by image sensing (step 82), and a second subject image is obtained by applying second signal processing to the subject image (step 83). The first subject image is subjected to face-image detection processing (step 84) and then the second subject image is subjected to face-image detection processing (step 85).

Processing is executed to compare the result of face-image detection in the first subject image and the result of face-image detection in the second subject image (step 86) and the result of detection obtained as a result of the comparison is registered (step 87).

FIGS. 37 to 44 are flowcharts illustrating processing utilizing a face image that has been detected.

Figure 37:
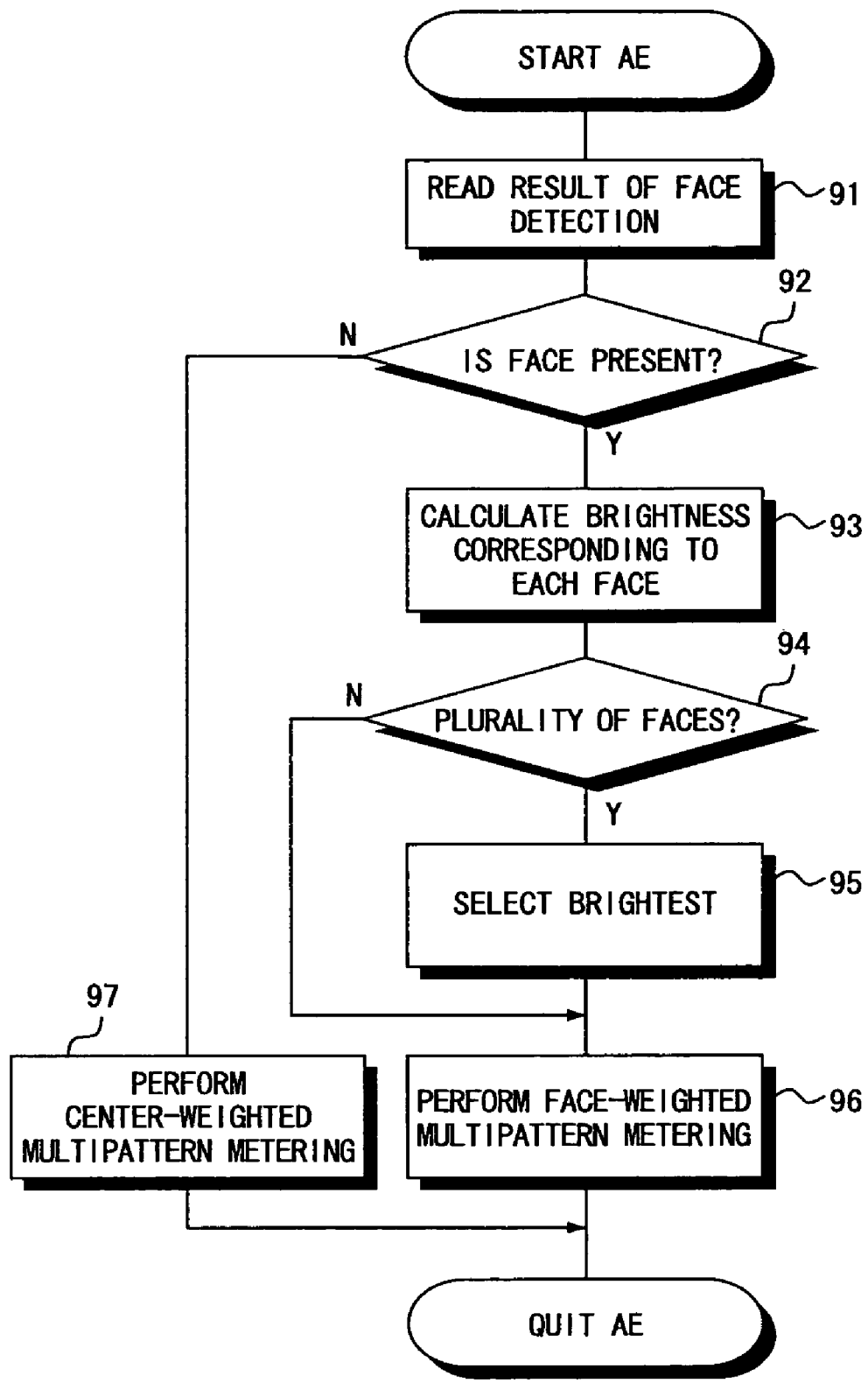
FIG. 37 is a flowchart illustrating processing for controlling automatic exposure.
Figure 38:
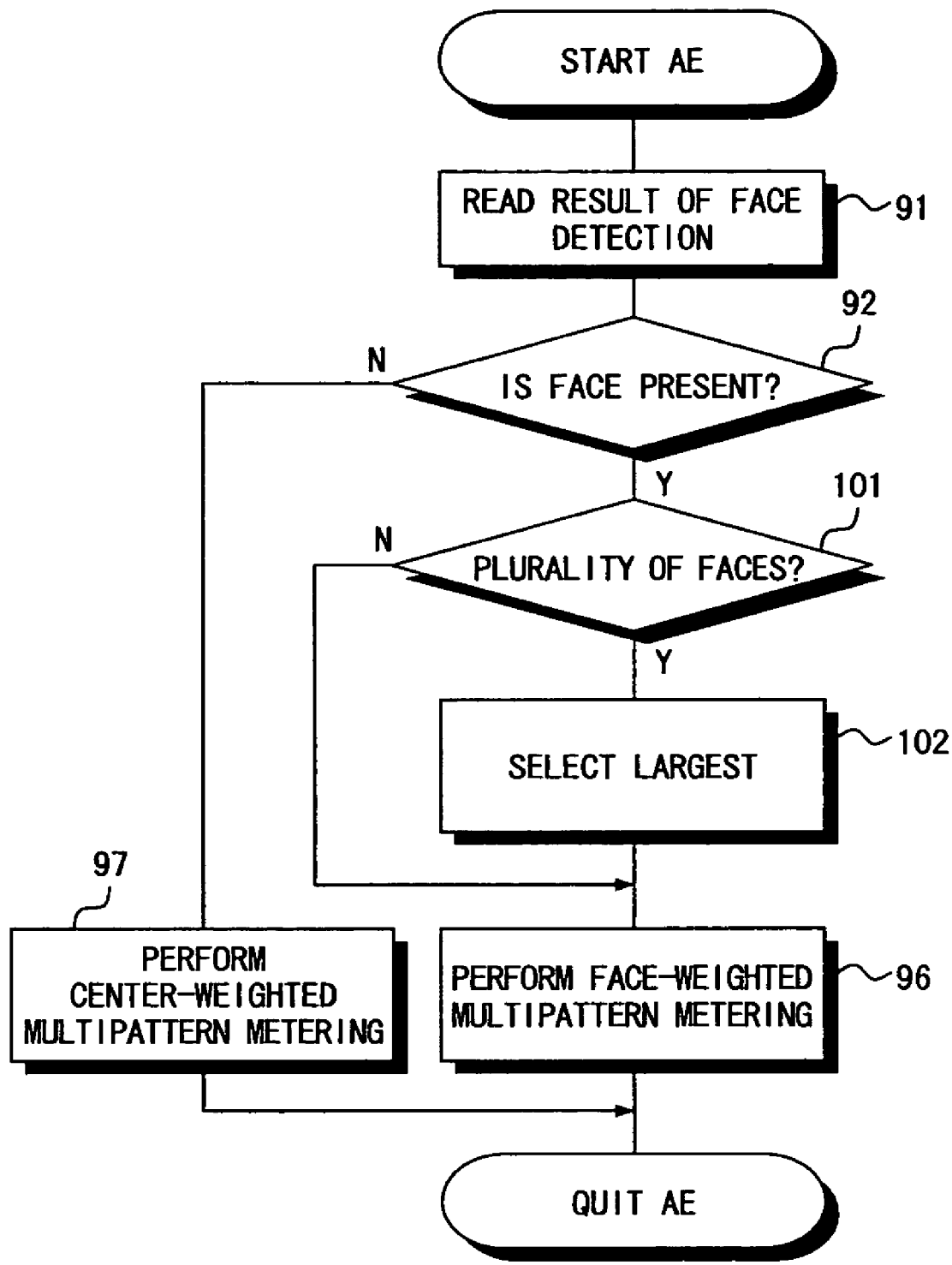
FIG. 38 is a flowchart illustrating processing for controlling automatic exposure.

FIGS. 37 and 38 are flowcharts illustrating processing for executing automatic exposure adjustment using a face-image area that has been detected.

As shown in FIG. 37, the result of face detection is read (step 91) and whether a face-image area is present or not is determined (step 92).

If a face-image area is present ("YES" at step 92), the brightness of the image within each detected face-image area is calculated (step 93). If there are a plurality of face-image areas ("YES" at step 94), the brightest face-image area is selected (step 95). Face-weighted multipattern metering, in which a photometric value is calculated based upon the image within the selected face-image area, is executed (step 96). If there is only one face-image area, face-weighted metering is executed based upon the image within this face-image area ("NO" at step 94; step 96).

If there is no face-image area ("NO" at step 92), then center-weighted multipattern metering, in which the photometric value is calculated based upon the central portion, is executed (step 97).

FIG. 38 illustrates other processing for automatic exposure adjustment. Processing in FIG. 38 identical with that shown in FIG. 37 is denoted by like step numbers and need not be described again.

If there are a plurality of face-image areas ("YES" at step 101) in the processing shown in FIG. 38, then the largest face-image area is selected (step 102). Metering is performed based upon the image within the selected face-image area (step 96).

Figure 39:
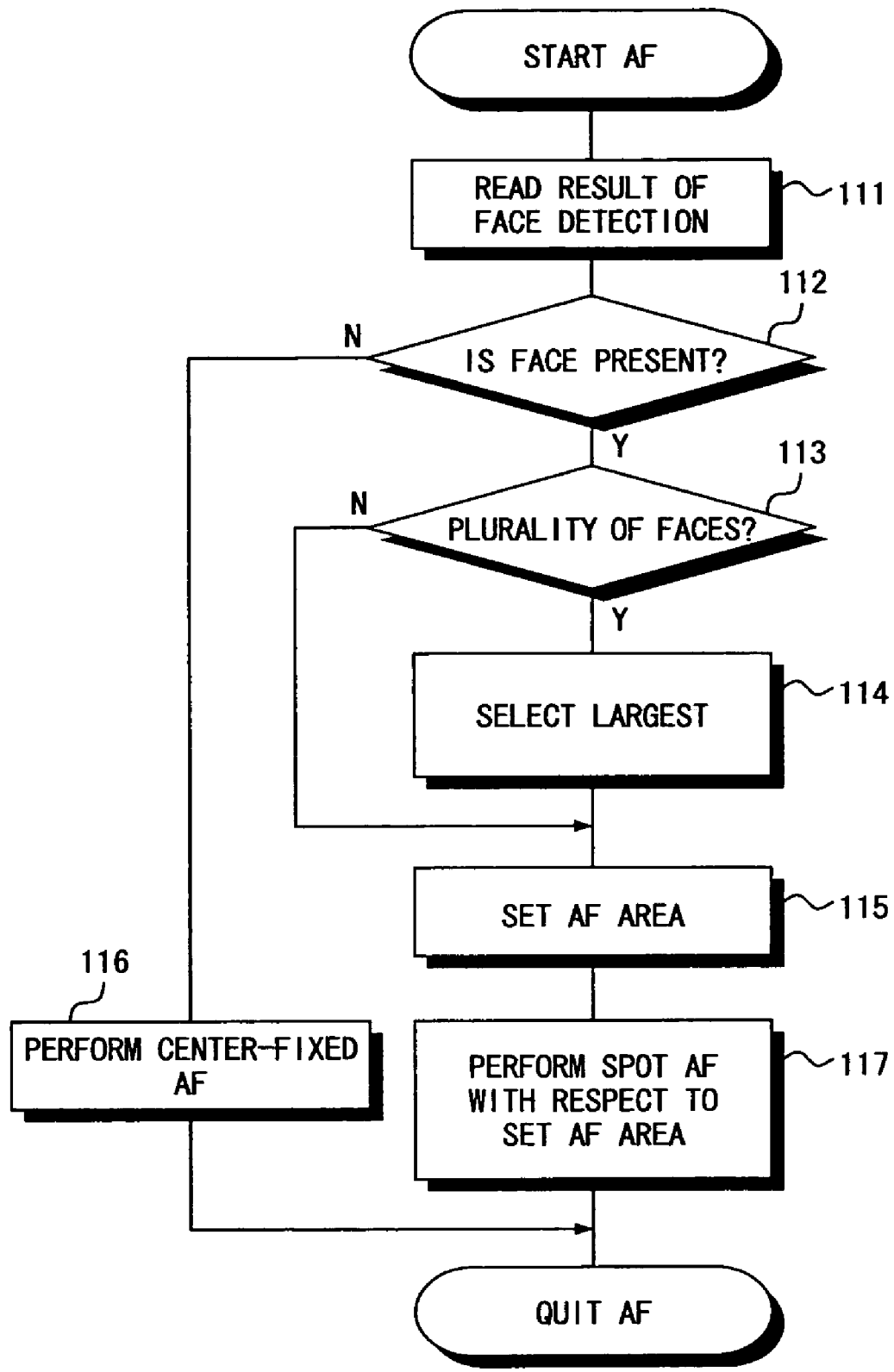
FIG. 39 is a flowchart illustrating processing for controlling automatic focus.
Figure 40:
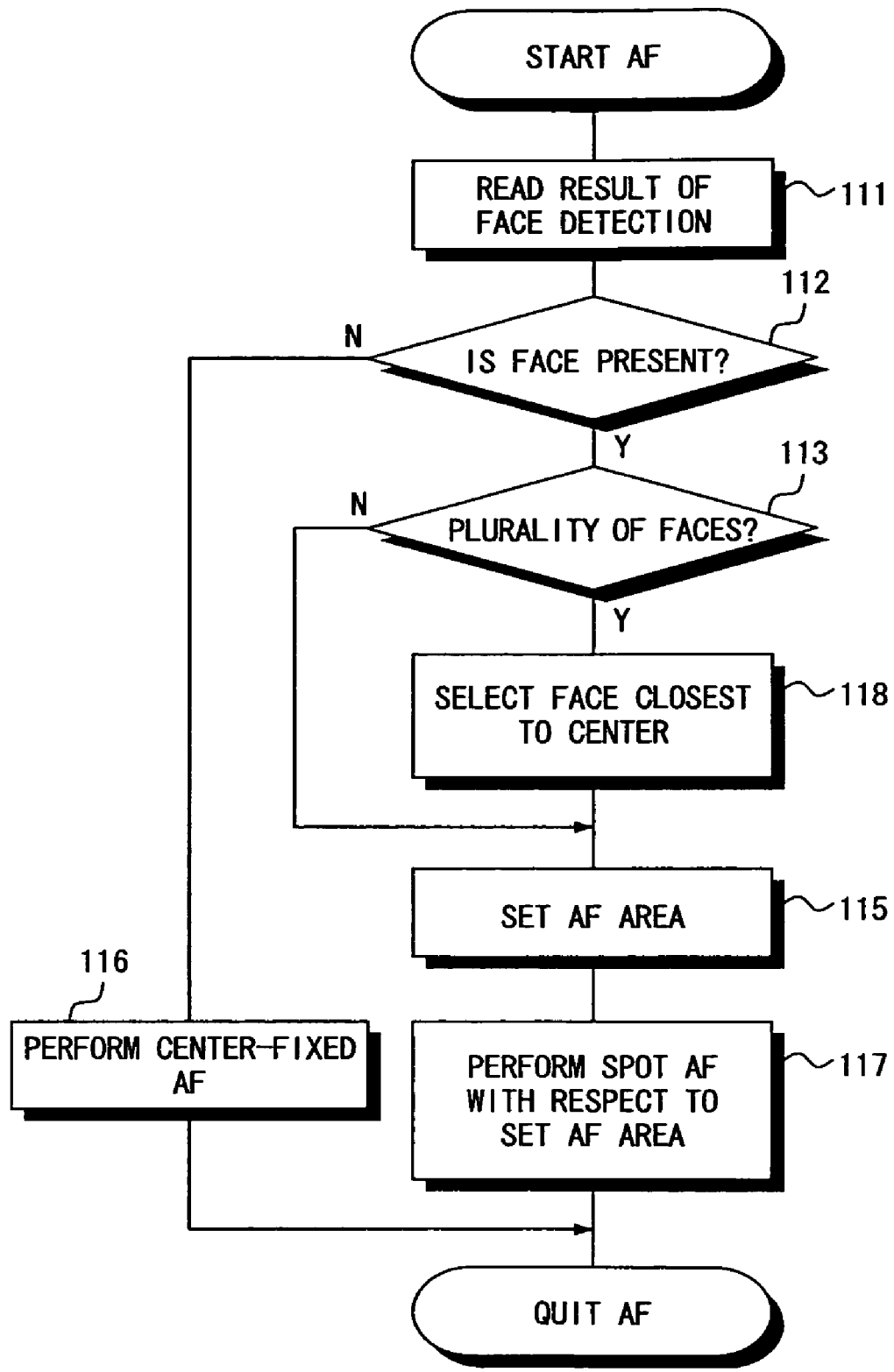
FIG. 40 is a flowchart illustrating processing for controlling automatic focus.

FIGS. 39 and 40 are flowcharts illustrating processing for executing automatic focus control utilizing a detected face-image area.

As shown in FIG. 39, the result of face detection is read (step 111). If a face-image area is present ("YES" at step 112), then whether a plurality of face-image areas exist is checked (step 113). If there are a plurality of face-image areas ("YES" at step 113), then the largest face-image area is selected (step 114) and the image within the selected face-image area is set as a focusing area (step 115). If there is only one face-image area ("NO" at step 113), then this single face-image area is set as the focusing area (step 115). Automatic focus processing is executed in such a manner that the selected area will come into focus (step 117).

If there is no face-image area ("NO" at step 112), automatic focus processing is executed in such a manner that the central portion of the subject image will come into focus (step 116).

FIG. 40 illustrates another example of automatic focus control. Processing in FIG. 40 identical with that shown in FIG. 39 is denoted by like step numbers and need not be described again.

If there are a plurality of face-image areas ("YES" at step 113), the face-image area at the portion of the subject image closest to the center is selected (step 118).

Figure 41:
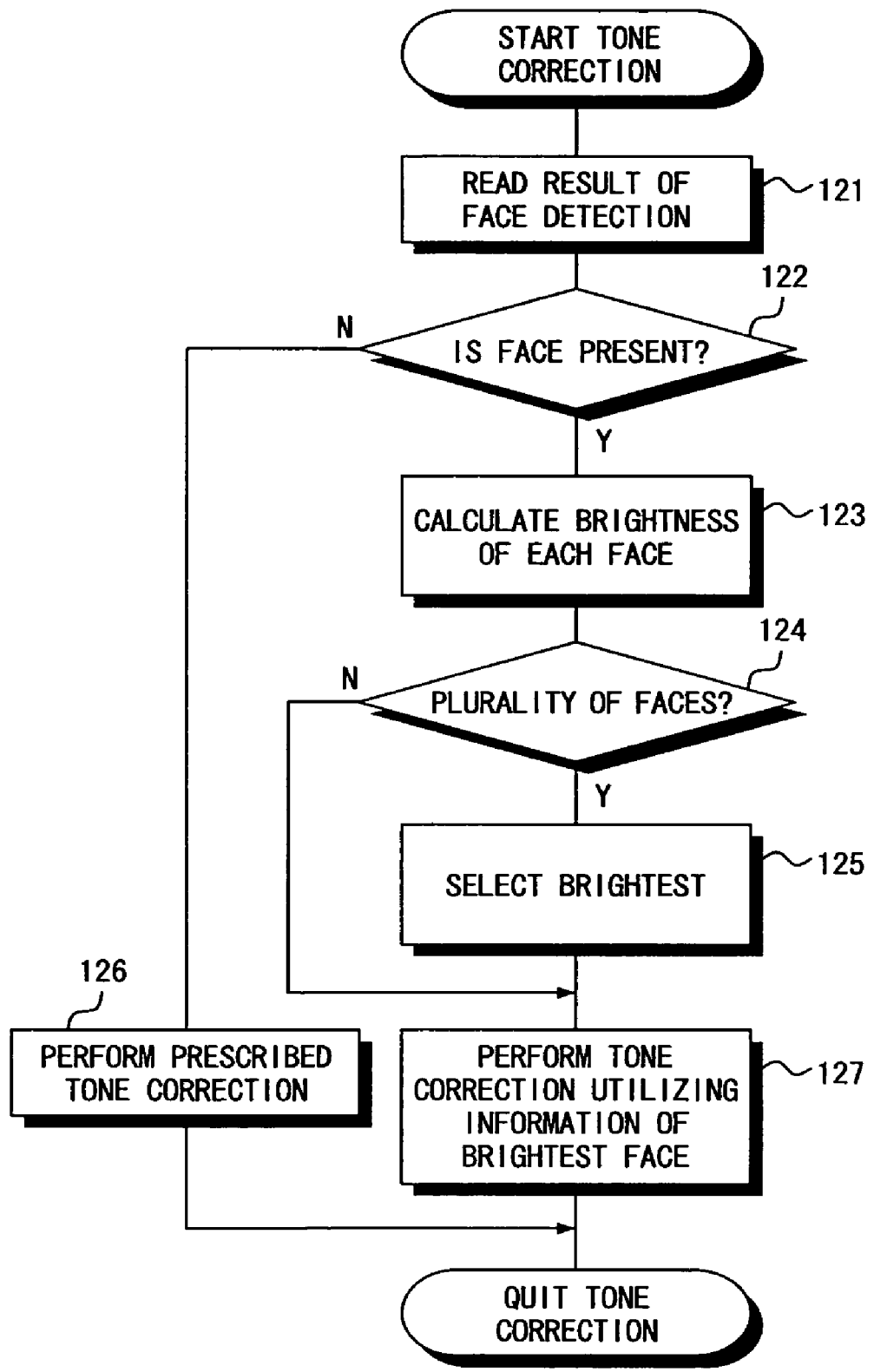
FIG. 41 is a flowchart illustrating tone correction processing.
Figure 42:
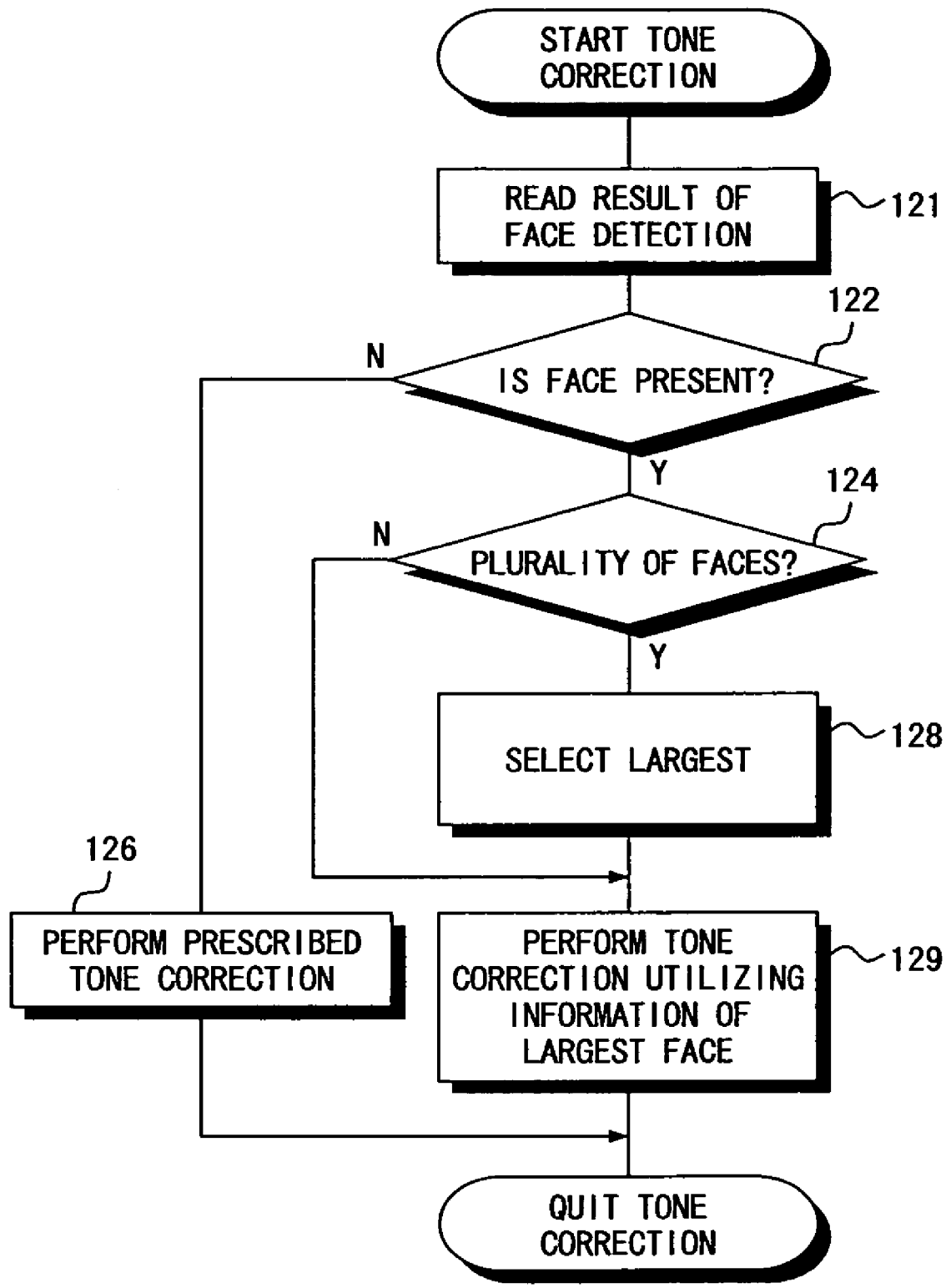
FIG. 42 is a flowchart illustrating tone correction processing.

FIGS. 41 and 42 are flowcharts illustrating tone correction processing.

As shown in FIG. 41, the result of face detection is read (step 121). If a face-image area is present ("YES" at step 122), the brightness of the image in each face-image area is calculated (step 123). If there are a plurality of face-image areas ("YES" at step 124), the brightest face-image area is selected (step 125). If there is only one face-image area ("NO" at step 124), then this face-image area is set. Tone correction processing is executed based upon the image within the face-image area that has been selected or set (step 127). If there is no face-image area ("NO" at step 122), then prescribed tone correction processing is executed (step 126).

FIG. 42 illustrates other tone correction processing. Processing in FIG. 42 identical with that shown in FIG. 41 is denoted by like step numbers and need not be described again.

If there are a plurality of face-image areas ("YES" at step 124), the largest face-image area is selected (step 128). Tone correction is performed using the image within the selected face-image area (step 129).

Figure 43:
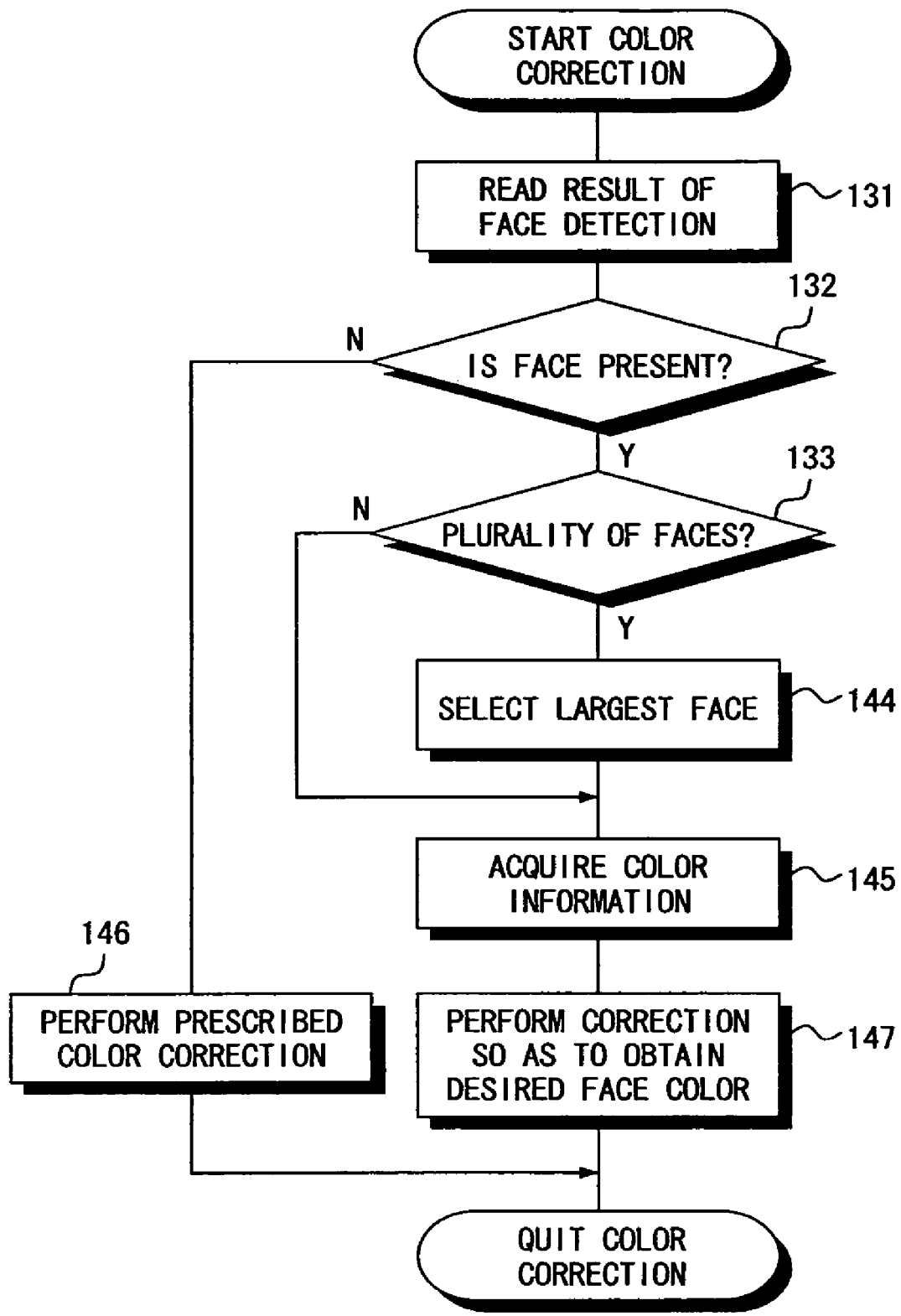
FIG. 43 is a flowchart illustrating color correction processing.
Figure 44:
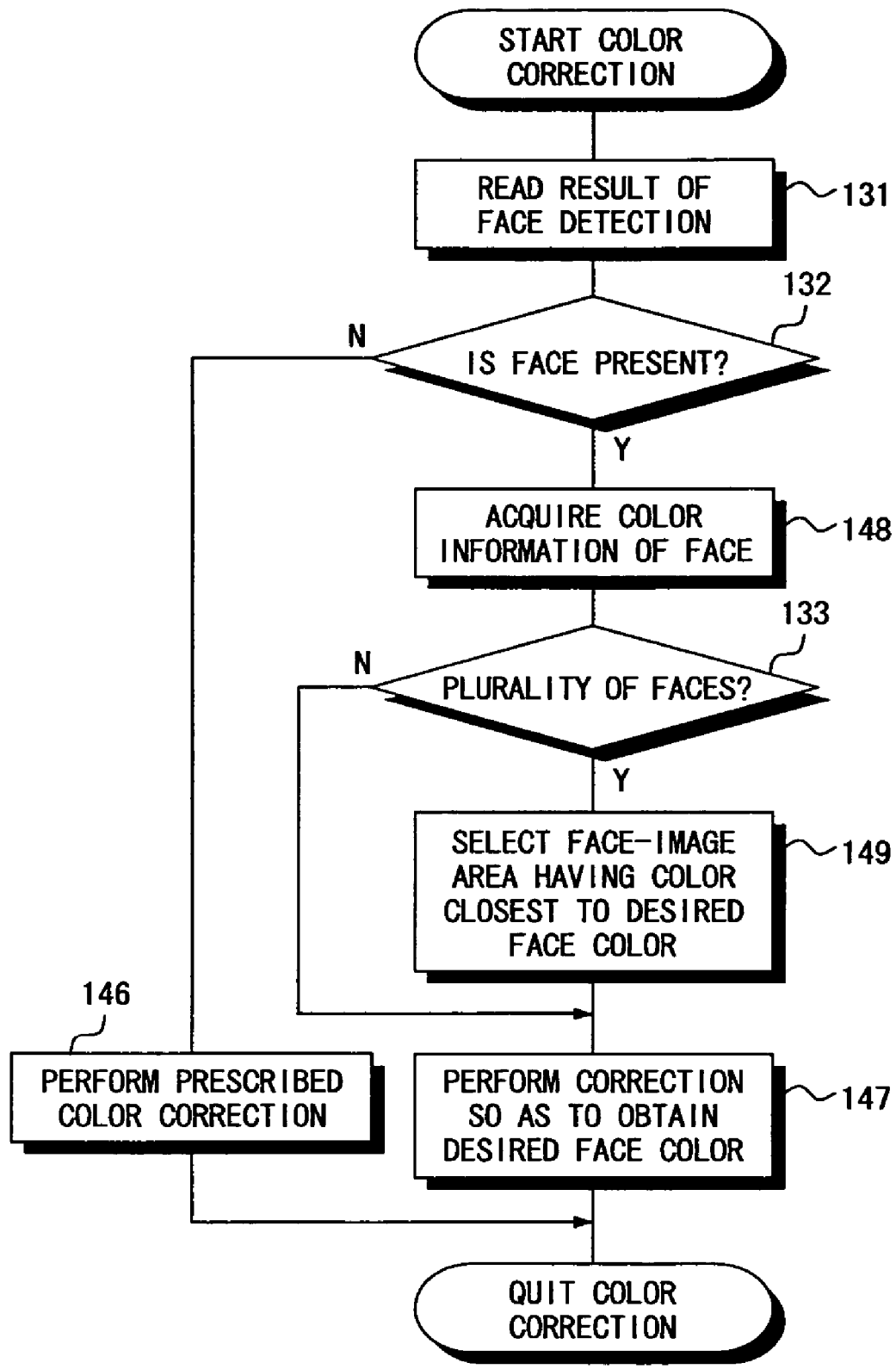
FIG. 44 is a flowchart illustrating color correction processing.

FIGS. 43 and 44 are flowcharts illustrating color correction processing.

As shown in FIG. 43, the result of face detection is read (step 131) and whether a face-image area is present or not is determined (step 132). If there is a face-image area ("YES" at step 132) and there are a plurality of face-image areas ("YES" at step 133), the largest face-image area is selected (step 144). If there is only one face-image area ("NO" at step 133), then this face-image area is set. Color information is acquired from the image within the face-image area that has been selected or set ("YES" at step 145) and a color adjustment is performed so as to obtain an image of the desired color (step 147). If there is no face-image area ("NO" at step 132), then a prescribed color correction is performed (step 146).

FIG. 44 illustrates another example of color correction processing. Processing in FIG. 44 identical with that shown in FIG. 43 is denoted by like step numbers and need not be described again.

If a face-image area is present ("YES" at step 132), color information of this face-image area is acquired (step 148). If there are a plurality of face-image areas, the face-image area having the color closest to the desired color is selected (step 149). If there is only one face-image area ("NO" at step 133), then this single face-image area is set. A color correction is carried out in such a manner that the image within the face-image area that has been selected or set will take on the desired color (step 147).

In the embodiments described above, a face-image area is detected (decided). However, it may be so arranged that an image other than a face image, e.g., an area such as the image of an eye, is similarly detected (decided).

Besides automatic exposure control performed based upon a face-image area decided as described above, it may be so arranged that flash (strobe) control, power-saving control, zoom control, gain adjustment, white balance adjustment, contour emphasis and noise reduction, etc., are carried out.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for detecting the position of a target image, comprising:
   a first detecting device for detecting a first position at which a target image is present from a first subject image among a plurality of frames of subject images obtained by sensing, simultaneously or successively, the images of subjects regarded as being substantially identical;
   a second detecting device for detecting a second position at which the target image is present from a second subject image among the plurality of frames of subject images; and
   a deciding device for deciding a position at which the target image is present in at least one of the first and second subject images based upon both of the first position detected by said first position detecting device and the second position detected by said second position detecting device,
   wherein if the amount of fluctuation between the first position detected by said first detecting device and the second position detected by said second detecting device is equal to or greater than a prescribed threshold value, then said deciding device decides that the target image is not present in at least one of the first and second subject images.

2. An apparatus for detecting the position of a target image, comprising:
   a first detecting device for detecting a first position at which a target image is present from a first subject image among a plurality of frames of subject images obtained by sensing, simultaneously or successively, the images of subjects regarded as being substantially identical;
   a second detecting device for detecting a second position at which the target image is present from a second subject image among the plurality of frames of subject images; and
   a deciding device for deciding a position at which the target image is present in at least one of the first and second subject images based upon both of the first position detected by said first position detecting device and the second position detected by said second position detecting device,
   wherein said first detecting device detects the first position at which the target image is present from the first subject image, which has been obtained by a first image sensing operation, from among a plurality of frames of subject images obtained by sensing a plurality of times, successively in terms of time, the images of subjects regarded as being substantially identical;
   said second detecting device detects the second position at which the target image is present from the second subject image, which has been obtained by a second image sensing operation, from among the plurality of frames of subject images;
   said apparatus further comprising a third detecting device for detecting a third position at which the target image is present from a third subject image, which has been obtained by a third sensing image operation, from among the plurality of frames of subject images;
   said deciding device decides that the position at which the target image is present is in at least one subject image among the first, second and third subject images based upon the first position, second position and third position detected by said first, second and third detecting devices, respectively,
   wherein said deciding device decides that the position at which the target image is present is in the third subject image based upon (a) a third position at which, among third positions detected by said third detecting device, a target image corresponding to the second position detected by said second detecting device is not present, and (b) a first position at which, among first positions detected by said first detecting device, target images corresponding to both the second position detected by said second detecting device and the third position detected by said third detecting device are not present.

3. An apparatus for detecting the position of a target image, comprising:
   a first detecting device for detecting a first position at which a target image is present from a first subject image among a plurality of frames of subject images obtained by sensing, simultaneously or successively, the images of subjects regarded as being substantially identical;
   a second detecting device for detecting a second position at which the target image is present from a second subject image among the plurality of frames of subject images;
   a deciding device for deciding a position at which the target image is present in at least one of the first and second subject images based upon both of the first position detected by said first position detecting device and the second position detected by said second position detecting device;
   a first image sensing device for outputting first image data representing the first subject image by sensing the image of a subject; and
   a second image sensing device for outputting second image data representing the second subject image by sensing the image of the subject;
   wherein said first detecting device detects the position at which the target image is present from the first subject image represented by the first image data that has been output from said first image sensing device;
   wherein said second detecting device detects the position at which the target image is present from the second subject image represented by the second image data that has been output from said second image sensing device;
   wherein said first and second image sensing devices have image-sensing ranges that are the same or different; and
   wherein said first detecting device detects, from the first subject image, the first position at which the target image is present based upon a value of target-image likeliness;
   said second detecting device also detects, from the second subject image, the second position at which the target image is present based upon a value of target-image likeliness; and
   said deciding device decides the position at which the target image is present based upon the value of target-image likeliness of the target image detected in said first detecting device and the value of target-image likeliness of the target image detected in said second detecting device.

4. An apparatus for detecting the position of a target image, comprising:
   a first detecting device for detecting a first position at which a target image is present from a first subject image among a plurality of frames of subject images obtained by sensing, simultaneously or successively, the images of subjects regarded as being substantially identical;
   a second detecting device for detecting a second position at which the target image is present from a second subject image among the plurality of frames of subject images;

a deciding device for deciding a position at which the target image is present in at least one of the first and second subject images based upon both of the first position detected by said first position detecting device and the second position detected by said second position detecting device; and a single-chip solid-state electronic image sensing device in which color filters of a plurality of colors are provided systematically on a photoreceptor surface, said device sensing the image of a subject to thereby output color image data of a plurality of colors representing a color image of the subject;

wherein the first subject image is represented by color image data of a single color in the color image data of the plurality of colors that has been output from said single-chip solid-state electronic image sensing device, and the second subject image is represented by color image data of a color different from that of the color image data of the single color in the color image data of the plurality of colors.

5. An apparatus for detecting the position of a target image, comprising:

a first detecting device for detecting a first position at which a target image is present from a first subject image among a plurality of frames of subject images obtained by sensing, simultaneously or successively, the images of subjects regarded as being substantially identical;

a second detecting device for detecting a second position at which the target image is present from a second subject image among the plurality of frames of subject images;

a deciding device for deciding a position at which the target image is present in at least one of the first and second subject images based upon both of the first position detected by said first position detecting device and the second position detected by said second position detecting device; and a solid-state electronic image sensing device that includes a plurality of a plurality of solid-state electronic image sensors in which color filters of different colors are provided on a photoreceptor surface, said device sensing the image of a subject to thereby output color image data of different colors;

wherein the first subject image is represented by color image data of one type in the color image data that has been output from said solid-state electronic image sensing device, and the second subject image is represented by color image data of a type different from that of the color image data of the one type in the color image data.

6. An apparatus for detecting the position of a target image, comprising:

a first detecting device for detecting a first position at which a target image is present from a first subject image among a plurality of frames of subject images obtained by sensing, simultaneously or successively, the images of subjects regarded as being substantially identical;

a second detecting device for detecting a second position at which the target image is present from a second subject image among the plurality of frames of subject images;

a deciding device for deciding a position at which the target image is present in at least one of the first and second subject images based upon both of the first position detected by said first position detecting device and the second position detected by said second position detecting device;

a visible-light sensor for sensing the image of a subject to thereby output visible-light image data that represents the first subject image as a visible-light image; and an infrared sensor for sensing the image of a subject to thereby output infrared-light image data that represents the second subject image as an infrared image;

wherein said first detecting device detects the position at which the target image is present from the first subject image represented by the visible-light image data that has been output from said visible-light sensor; and said second detecting device detects the position at which the target image is present from the second subject image among the plurality of frames of subject images represented by the infrared image data that has been output from said infrared sensor.

7. An apparatus for detecting the position of a target image, comprising:

a first detecting device for detecting a first position at which a target image is present from a first subject image among a plurality of frames of subject images obtained by sensing, simultaneously or successively, the images of subjects regarded as being substantially identical;

a second detecting device for detecting a second position at which the target image is present from a second subject image among the plurality of frames of subject images;

a deciding device for deciding a position at which the target image is present in at least one of the first and second subject images based upon both of the first position detected by said first position detecting device and the second position detected by said second position detecting device; and a visible-light/infrared solid-state electronic image sensing device that includes a visible-light filter and an infrared filter, said device sensing the image of a subject to thereby output visible-light image data that represents the first subject image as a visible-light image and infrared image data that represents the second subject image as an infrared image;

wherein said first detecting device detects the position at which the target image is present from the first subject image represented by the visible-light image data that has been output from said visible-light/infrared solid-state electronic image sensing device; and said second detecting device detects the position at which the target image is present from the second subject image represented by the infrared image data that has been output from said visible-light/infrared solid-state electronic image sensing device.

8. An apparatus for detecting the position of a target image, comprising:

a first detecting device for detecting a first position at which a target image is present from a first subject image among a plurality of frames of subject images obtained by sensing, simultaneously or successively, the images of subjects regarded as being substantially identical;

a second detecting device for detecting a second position at which the target image is present from a second subject image among the plurality of frames of subject images;

a deciding device for deciding a position at which the target image is present in at least one of the first and second subject images based upon both of the first position detected by said first position detecting device and the second position detected by said second position detecting device; and an image sensing device for sensing the image of a subject at fixed periods and alternately outputting first image data representing a first field of a subject image and image data representing a second field of the subject image;

wherein said first detecting device detects the position at which the target image is present from the first field of the subject image represented by a first field of image data that has been output from said image sensing device; and said second detecting device detects the position at which the target image is present from the second field of the subject image represented by a second field of image data that has been output from said image sensing device.

* * * * *